United States Patent
Hashimoto et al.

(10) Patent No.: US 8,306,386 B2
(45) Date of Patent: Nov. 6, 2012

(54) REPRODUCTION DEVICE, IMAGE SYNTHESIS METHOD, IMAGE SYNTHESIS PROGRAM, AND INTEGRATED CIRCUIT

(75) Inventors: Satoshi Hashimoto, Kadoma (JP); Masahiro Oashi, Kyoto (JP); Tomoyuki Okada, Nara (JP); Wataru Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 1143 days.

(21) Appl. No.: 11/720,531

(22) PCT Filed: Nov. 30, 2005

(86) PCT No.: PCT/JP2005/022022
§ 371 (c)(1),
(2), (4) Date: Jul. 31, 2007

(87) PCT Pub. No.: WO2006/059661
PCT Pub. Date: Jun. 8, 2006

(65) Prior Publication Data
US 2008/0089660 A1    Apr. 17, 2008

(30) Foreign Application Priority Data
Dec. 1, 2004  (JP) .................. 2004-349143

(51) Int. Cl.
*H04N 9/80* (2006.01)
*H04N 5/93* (2006.01)
(52) U.S. Cl. .................. 386/239; 386/248; 386/353
(58) Field of Classification Search .................. 386/239, 386/240, 248, 353
See application file for complete search history.

(56) References Cited

U.S. PATENT DOCUMENTS

| | | | |
|---|---|---|---|
| 6,538,656 B1 | 3/2003 | Cheung et al. | |
| 6,573,905 B1 | 6/2003 | MacInnis et al. | |
| 6,636,222 B1 | 10/2003 | Valmiki et al. | |
| 6,853,385 B1 | 2/2005 | MacInnis et al. | |
| 2003/0095135 A1* | 5/2003 | Kaasila et al. | 345/613 |
| 2003/0231259 A1 | 12/2003 | Yui et al. | |

(Continued)

FOREIGN PATENT DOCUMENTS

EP    1328114    7/2003

(Continued)

OTHER PUBLICATIONS

English Language Abstract of JP 2003-348444.

(Continued)

*Primary Examiner* — Thai Tran
*Assistant Examiner* — Hung Dang
(74) *Attorney, Agent, or Firm* — Greenblum & Bernstein, P.L.C.

(57) ABSTRACT

In a playback device for playing back a moving image recorded on a recording medium while executing an application recorded on the recording medium, to improve the use efficiency of a memory bus when combining the moving image with an image relating to the application. Whether or not to combine a background image, which is used as a background of GUI graphics such as a menu or a moving picture used by the application, is determined depending on whether the moving image covers the entire background image. If the moving image covers the background image, there is no need to combine the background image with the moving image. In this case, a memory bus allocated to the reading of the background image can be used for, for example, writing the moving image read from the recording medium onto a memory. Hence the memory bus bandwidth can be effectively used.

6 Claims, 32 Drawing Sheets

U.S. PATENT DOCUMENTS

| | | |
|---|---|---|
| 2004/0047588 A1 | 3/2004 | Okada et al. |
| 2004/0107380 A1 | 6/2004 | Vollschwitz |
| 2005/0105888 A1 | 5/2005 | Hamada et al. |
| 2005/0156937 A1 | 7/2005 | Vollschwitz |
| 2005/0156938 A1 | 7/2005 | Vollschwitz |
| 2005/0162337 A1 * | 7/2005 | Ohashi et al. .................. 345/1.1 |
| 2005/0244135 A1 | 11/2005 | Yahata et al. |
| 2006/0098936 A1 | 5/2006 | Ikeda et al. |
| 2006/0143666 A1 | 6/2006 | Okada et al. |

FOREIGN PATENT DOCUMENTS

| | | |
|---|---|---|
| EP | 1328114 A1 * | 7/2003 |
| JP | 2000-010542 | 1/2000 |
| JP | 2003-298938 | 10/2003 |
| JP | 2003-348444 | 12/2003 |
| JP | 2004-007518 | 1/2004 |
| JP | 2004-102343 | 4/2004 |
| JP | 2004-304767 | 10/2004 |
| JP | 2004-334058 | 11/2004 |
| WO | 2004/025651 | 3/2004 |
| WO | 2004/030356 | 4/2004 |
| WO | 2004/074976 | 9/2004 |
| WO | 2004/082274 | 9/2004 |

OTHER PUBLICATIONS

English Language Abstract of JP 2000-010542.
English Language Abstract of JP 2004-102343.
Imai, "Development of Digital Television Receivers" pp. 1-56, Apr. 15, 2002, together with a partial English language translation.
U.S. Appl. No. 11/568,555 to Hashimoto et al., filed Nov. 1, 2006.
U.S. Appl. No. 11/571,955 to Hashimoto et al., filed Jan. 11, 2007.

* cited by examiner

FIG. 11

STN_table

| |
|---|
| number_of_video_stream_entries |
| number_of_audio_stream_entries |
| number_of_PG_textST_stream_entries |
| number_of_IG_stream_entries | video_streams permitted to be played back in PlayItem
- entry-attribute audio_streams permitted to be played back in PlayItem
- entry-attribute
- entry-attribute
- entry-attribute
- entry-attribute
- :
- entry-attribute PG_streams permitted to be played back in PlayItem
- entry-attribute
- entry-attribute
- entry-attribute
- entry-attribute
- :
- entry-attribute IG_streams permitted to be played back in PlayItem
- entry-attribute
- entry-attribute entry_attribute of video_stream entry_attribute of audio_stream entry_attribute of PG_stream entry_attribute of IG_stream

FIG. 15

| Application Management Table (AMT) |
|---|
| PlayList Management Table (PLMT) |

FIG. 17A

| life_cycle |
|---|
| apli_id_ref |
| run_attribute |
| run_priority |

FIG. 17B

| life_cycle | apli_id_ref | run_attribute | run_priority |
|---|---|---|---|
| "life cycle" of application represented by Title, PL, Chapter | "application ID" reference value being 5-digit integer ZZZZZ assigned to JAR filename | "run attribute" that is Auto Run, Present (no specification), or Suspend | "run priority" that takes value ranging from 0 to 255 |

FIG. 24

| Application status in immediately preceding title | Run attribute | | |
|---|---|---|---|
| | Present | AutoRun | Suspend |
| Not run | Maintain status with no operation | Start application | Maintain status with no operation |
| Running | Maintain status with no operation | Maintain status with no operation | Suspend |
| Suspend | Resume | Resume | Maintain status with no operation |

FIG. 25A

| PL_id_ref |
|---|
| Playback_Attribute |

FIG. 25B

| PL_id_ref | Playback_Attribute |
|---|---|
| "PlayList ID" being 5-digit value in filename of MPLS file | "playback attribute" that is Auto Play or Present (no specification) |

FIG. 27

| | Branch destination title has no PLMT | Branch destination title has PLMT | |
|---|---|---|---|
| | | Playback attribute : Auto Play | Playback attribute : Present |
| Branch source title being played back | Stop playback | Maintain status | Maintain status |
| Branch source title not being played back | Maintain status | Start automatic playback | Maintain status |

REPRODUCTION DEVICE, IMAGE SYNTHESIS METHOD, IMAGE SYNTHESIS PROGRAM, AND INTEGRATED CIRCUIT

TECHNICAL FIELD

The present invention relates to a playback device that executes an application while playing back a moving image, and to a method of using a memory bus when combining images.

BACKGROUND ART

Video playback devices including DVD (Digital Versatile Disc) players and BD (Blu-ray Disc) players are developed in recent years. Such a player is capable of reading video stream data from a recording medium such as a DVD or a BD and playing back a moving image. While playing back the moving image, the player may also execute an application recorded on the recording medium, and display an image related to the application separately from the moving image. Examples of this include displaying, beside the moving image, a menu GUI (Graphical User Interface) relating to the moving image, and displaying subtitles.

Here, the player combines (overlays) the moving image and the image which is subjected to a display control by the application to generate image data, and displays the generated image data on a display. Data to be combined is sequentially read from the recording medium and written to a corresponding area on a memory of the player. The player reads image data from the memory, combines the image data, and outputs a resulting composite image. The corresponding area on the memory of the player is any of a video plane for storing image data of the moving image, an IG (Interactive Graphics) plane for storing image data of a GUI menu to be displayed together with the moving image, and the like. To combine images, the player needs to access each plane.

The player needs to access each plane at high speed when producing a composite image. To play back video without a delay, it is important to effectively use a memory bus upon such access.

Patent document 1 describes a technique relating to memory writing. According to this technique, when a GUI object needs to be drawn again, unnecessary writing to a memory is suppressed by a checking means for specifying an area that needs to be repaired and a generation means for determining an object that needs to be drawn again. A memory bus bandwidth can be effectively used as a result of suppressing unnecessary writing in this way.

Patent document 1: Japanese Patent Application Publication No. 2004-102343

DISCLOSURE OF THE INVENTION

Problems the Invention is Going to Solve

As mentioned above, the player writes to and reads from the planes. These memory writing and reading share one memory bus in view of costs and spaces. For example, when displaying an image of a HD quality (1920×1080 pixels), in the case of 2 B/pixel and 30 fps, writing a moving image requires a memory bus bandwidth of about 120 MB/sec (1920×1080×2×30), and similarly reading a moving image requires a memory bus bandwidth of about 120 MB/sec. Also, writing and reading a background image each require a memory bus bandwidth of about 120 MB/sec. Meanwhile, writing and reading graphics such as a GUI menu each require a memory bus bandwidth of about 240 MB/sec (1920×1080×4×30) in the case of 4 B/pixel and 30 fps. If there are subtitles, it is necessary to write the data to and read the data from the memory, too. These writing and reading each require a memory bus bandwidth of about 120 MB/sec. When playing back video, reading and writing are performed in parallel. Accordingly, a bandwidth close to 2 GB/sec is necessary in order to combine image data of these planes. A further increase in picture quality in the future could raise the need for a greater memory bus bandwidth. This constitutes a factor that hinders lower-cost players.

In view of this, the present invention aims to provide a new playback device that allows for effective use of a memory bus bandwidth which is used to read image data.

Means of Solving the Problems

The stated aim can be achieved by a playback device including: a memory unit having memory areas for a video plane for storing a moving image, an image plane for storing a GUI image to be displayed as a GUI, and a still plane for storing a background image; a moving image storing unit operable to store the moving image onto the video plane; a GUI image storing unit operable to store the GUI image onto the image plane; a background image storing unit operable to store the background image onto the still plane; and a composite output unit operable to (a) read the moving image and the GUI image without reading the background image if the moving image has a predetermined size sufficient to cover the whole background image, and read the moving image, the GUI image, and the background image if the moving image does not have the predetermined size, (b) combine the read images by overlaying to generate a composite image, and (c) output an image signal representing the composite image.

Effects of the Invention

According to this construction, when the background image is unnecessary, that is, when the moving image conceals the background image, there is no need to combine the background image, and so there is no need to read the background image from the memory. In such a case, the reading of data of the background image is omitted. Thus, by omitting the reading of the background image when the moving image has the predetermined size, such as a full-screen size, of covering the background image, the load on the playback device can be alleviated, and a memory bus bandwidth used for the reading can be freed.

By suppressing the reading of an unnecessary background image in this way, a memory bus originally used for the reading of a background image can be used for another purpose such as the writing of a GUI image to the memory. As a result, the memory bus bandwidth can be used effectively, with it being possible to alleviate problems such as a delay in displaying images.

Usually, planes of a same size are overlaid one on top of another to produce a composite image. However, there may be a case where a moving image is displayed having been changed from the original full-screen size to a smaller size, that is, a moving image does not cover a whole background image. In such a case, the background image is necessary and so is combined with the other images.

In the case of the aforementioned HD quality, if the memory bus bandwidth of 120 MB/sec for reading a background image is instead used for writing a moving image or the like, a moving image writing rate can be doubled. As a result, a situation where the playback of a moving image is delayed because data of the moving image has not been written at the time of reading and so the reading cannot be carried out can be avoided.

Here, the playback device may further include: a virtual machine unit operable to execute an application relating to the moving image, wherein the predetermined size is a size of the moving image being displayed full screen, and the composite output unit reads the background image if the application issues a scaling-down instruction for the video plane, and does not read the background image if the application does not issue the scaling-down instruction.

The full screen refers to such a size that covers an entire display screen of a display device, such as a television, of an external device connected to the playback device, a monitor included in the playback device, or the like.

The playback device changes the size of the moving image based on an instruction from an application being executed. In general, this change instruction is made for the video plane. However, upon receiving this instruction, the composite output unit judges whether to read data from the still plane. In this way, the judgment as to whether to output data from the still plane can be performed easily.

Here, the playback device may further include: an image storing unit operable to store an image, different from the moving image, that changes with time, onto the still plane, wherein the still plane is for further storing the image that changes with time, and the composite output unit (a) reads the moving image stored on the video plane, the GUI image stored on the image plane, and the image that changes with time stored on the still plane if the moving image has a size of being displayed full screen, and reads the moving image stored on the video plane, the GUI image stored on the image plane, and the background image stored on the still plane if the moving image does not have the size of being displayed full screen, (b) combines the read images by overlaying to generate a composite image, and (c) outputs an image signal representing the composite image.

The image that changes with time is an image that differs from the moving image stored by the moving image storing unit, and varies in display contents with time. One example of this is an image for displaying subtitles.

According to this construction, one common memory area can substitute for two conventionally separate memory areas, namely, a still plane and a subtitle plane for storing subtitles. This makes it possible to free one memory area, which can be used for storing other data. Hence the memory can be used effectively. Also, one plane is omitted when compared with the conventional case where a still plane and a subtitle plane are provided, which contributes to a smaller memory bus bandwidth to be accessed.

Here, the composite output unit, the moving image storing unit, the GUI image storing unit, and the background image storing unit may share a memory bus connected to the memory unit, wherein the GUI image storing unit uses, if the composite output unit does not read the background image stored on the still plane, a time or a band of the memory bus allocated to the reading of the background image from the still plane, for writing the GUI image onto the image plane.

According to this construction, the playback device can use the memory bus bandwidth effectively, by using the memory bus bandwidth, which is allocated to the reading of the background image, to write data onto the image plane. Since the GUI image has a higher quality than the moving image or the background image, the writing of the GUI image onto the image plane tends to require a longer time and a larger memory bus bandwidth. However, the writing of the GUI image onto the image plane can be accelerated by using a memory bus which is allocated to the reading of data from the still plane.

The stated aim can also be achieved by an image combination method for combining images in a playback device including a memory unit having memory areas for a video plane for storing a moving image, an image plane for storing a GUI image to be displayed as a GUI, and a still plane for storing a background image, the image combination method including: a moving image storing step of storing the moving image onto the video plane; a GUI image storing step of storing the GUI image onto the image plane; a background image storing step of storing the background image onto the still plane; and a composite output step of (a) reading the moving image and the GUI image without reading the background image if the moving image has a predetermined size sufficient to cover the whole background image, and reading the moving image, the GUI image, and the background image if the moving image does not have the predetermined size, (b) combining the read images by overlaying to generate a composite image, and (c) outputting an image signal representing the composite image.

According to this method, the playback device refrains from reading data from the still plane when unnecessary, with it being possible to free a corresponding memory bus bandwidth.

The stated aim can also be achieved by an image combination program showing a procedure for having a computer of a playback device combine images, the playback device including a memory unit having memory areas for a video plane for storing a moving image, an image plane for storing a GUI image to be displayed as a GUI, and a still plane for storing a background image, the image combination program showing the procedure including: a moving image storing step of storing the moving image onto the video plane; a GUI image storing step of storing the GUI image onto the image plane; a background image storing step of storing the background image onto the still plane; and a composite output step of (a) reading the moving image and the GUI image without reading the background image if the moving image has a predetermined size sufficient to cover the whole background image, and reading the moving image, the GUI image, and the background image if the moving image does not have the predetermined size, (b) combining the read images by overlaying to generate a composite image, and (c) outputting an image signal representing the composite image.

According to this program, the playback device refrains from reading data from the still plane when unnecessary, with it being possible to free a corresponding memory bus bandwidth.

The stated aim can also be achieved by an integrated circuit installed in a playback device for combining images and outputting a composite image, the integrated circuit including: a memory unit having memory areas for a video plane for storing a moving image, an image plane for storing a GUI image to be displayed as a GUI, and a still plane for storing a background image; a moving image storing unit operable to store the moving image onto the video plane; a GUI image storing unit operable to store the GUI image onto the image plane; a background image storing unit operable to store the background image onto the still plane; and a composite output unit operable to (a) read the moving image and the GUI image without reading the background image if the moving image has a predetermined size sufficient to cover the whole background image, and read the moving image, the GUI image, and the background image if the moving image does not have the predetermined size, (b) combine the read images by overlaying to generate a composite image, and (c) output an image signal representing the composite image.

According to this integrated circuit, the playback device refrains from reading data from the still plane when unnecessary, with it being possible to free a corresponding memory bus bandwidth.

BRIEF DESCRIPTION OF THE DRAWINGS

FIG. 11 shows an STN table included in PlayList information.

FIG. 15 shows an internal structure of a BD-J Object.

FIG. 17A shows an internal structure of an application management file, and FIG. 17B shows meanings of information elements in the application management table.

FIG. 24 shows combinations of three run attributes (Present, AutoRun, and Suspend) and three application statuses of an immediately preceding Title (Not Run, Running, and Suspend).

FIG. 25A shows an internal structure of a PlayList management table, and FIG. 25B shows meanings of information elements in the PlayList management table.

FIG. 27 shows six combinations of three possible statuses of a current Title (Not having PlayList management table, Having PlayList management table and AutoPlay, and Having PlayList management table and Present) and two possible statuses of a PL in an immediately preceding Title (Not being played back, and being played back).

DESCRIPTION OF REFERENCE NUMERALS

Figure 1:
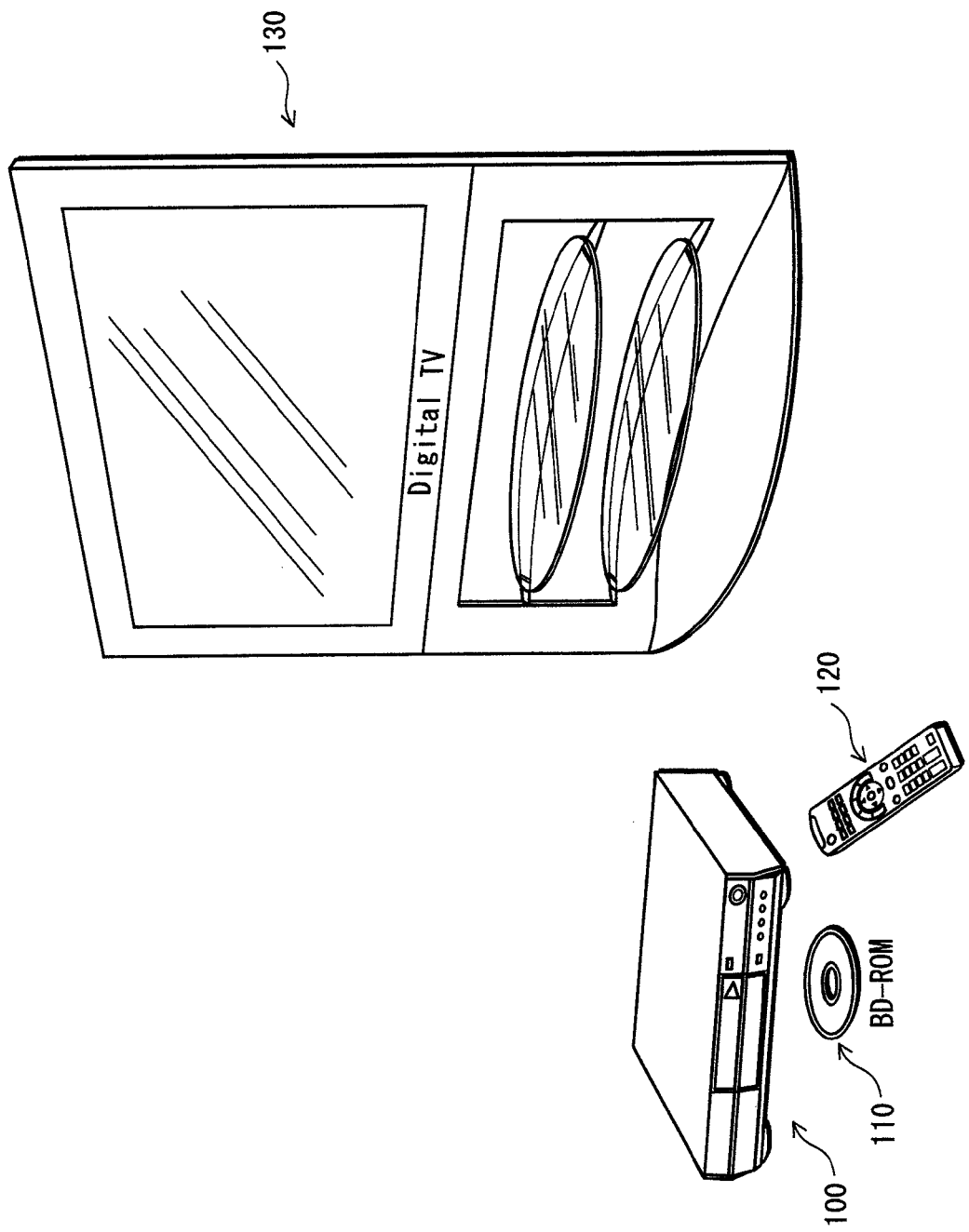
FIG. 1 shows a form of use of a playback device to which the present invention relates.

1 . . . BD-ROM drive
2 . . . read buffer
3 . . . demultiplexer
4 . . . video decoder
5 . . . video plane
6 . . . sound processor
7 . . . sound processor
8 . . . mixer
9 . . . sound controller
10 . . . D/A converter
11 . . . Interactive Graphics decoder
12 . . . Interactive Graphics plane
13 . . . Presentation Graphics decoder
14 . . . Presentation Graphics plane
15 . . . JPEG decoder
16 . . . Still plane
17 . . . Still Plane control unit
18a, 18b, 18c . . . combining unit
19 . . . STC-DELTA addition unit
20 . . . ATC-DELTA addition unit
21 . . . local storage
22 . . . instruction ROM
23 . . . user event processing unit
24 . . . PSR set
25 . . . CPU
26 . . . scenario memory
27 . . . local memory
28 . . . PG plane control unit
100 . . . playback device

BEST MODE FOR CARRYING OUT THE INVENTION

First Embodiment

The following describes a playback device which is one embodiment of the present invention, with reference to drawings.

<Construction>
<Form of Use>

FIG. 1 shows a form of use of the playback device.

As shown in FIG. 1, a playback device 100, in which a BD-ROM 110 is loaded, plays back a moving image recorded on the BD-ROM 110 and displays the moving image on a television 130 which is connected through wires or by radio.

Also, the playback device 100 executes a Java™ application recorded on the BD-ROM 110, and displays an image based on the application.

A remote control 120 is used for receiving user operations. The remote control 130 has various keys for controlling the playback device 100, including keys for receiving operations such as playback start (Play), playback stop (Stop), pause (Pause On), pause clear (Pause Off), Still function clear (still off), fast forward at designated speed (Forward Play (speed)), rewind at designated speed (Backward Play (speed)), audio switching (Audio Change), subtitle switching (Subtitle Change), and angle switching (Angle Change), a MoveUp key, a MoveDown key, a MoveRight key, and a MoveLeft key for receiving focus movement operations when operating a menu, a Pop-up key for receiving a menu display operation, and a Numeric key for receiving a number input.

This completes the description of the form of use of the playback device 100 according to the present invention.

<Hardware Construction of the Playback Device 100>

Figure 2:
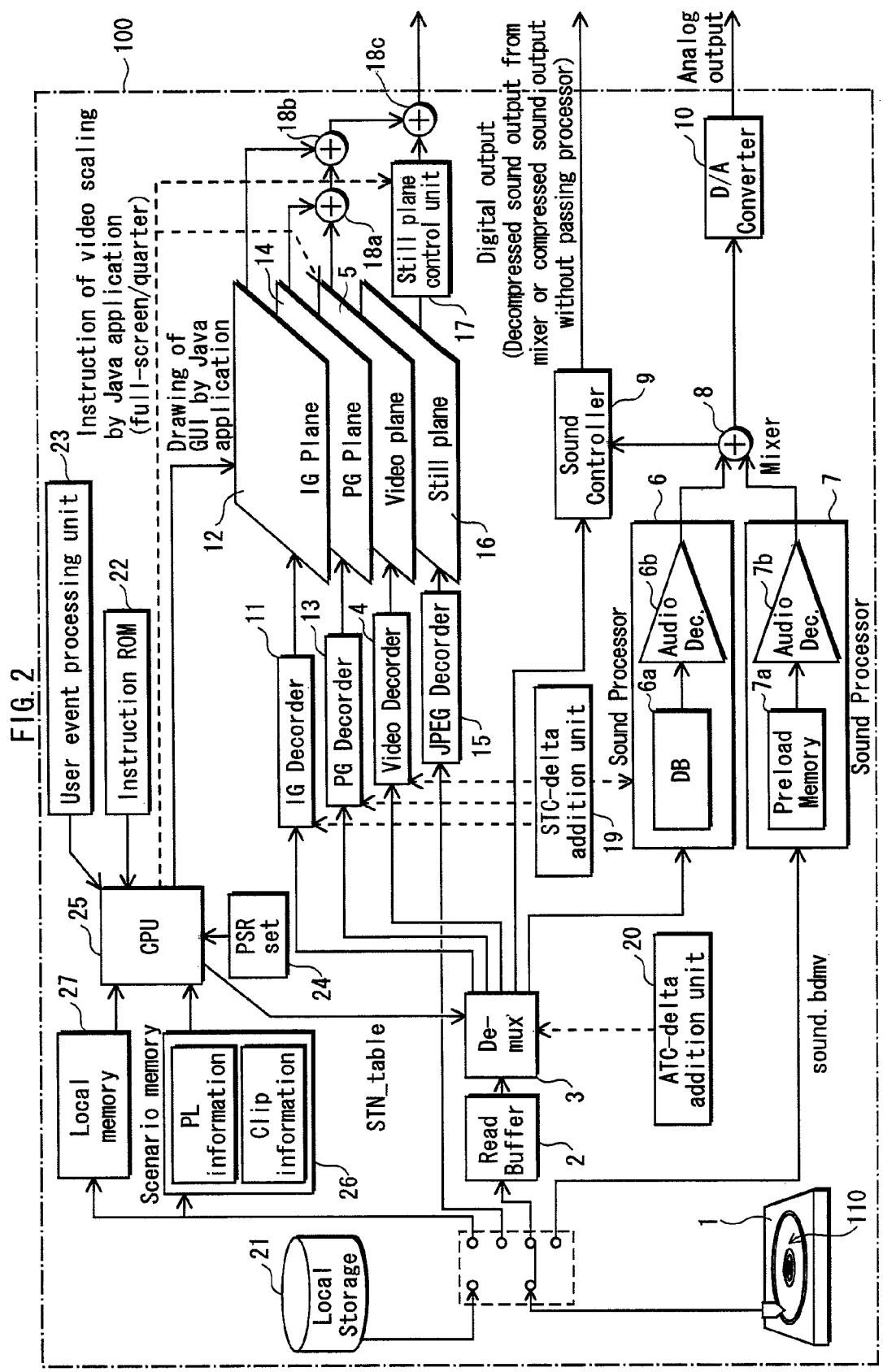
FIG. 2 is a block diagram showing a functional construction of a playback device 100 according to a first embodiment.

The following describes a functional construction of the playback device 100, with reference to FIG. 2. The playback device 100 according to the present invention is manufactured based on the internal construction shown in FIG. 2. The playback device 100 according to the present invention is roughly made up of two parts that are a system LSI (Large Scale Integration) and a drive device. The playback device 100 according to the present invention can be manufactured by mounting these parts on a cabinet and a substrate of the device. The system LSI is an integrated circuit including various processing units for achieving the functions of the playback device. The playback device 100 manufactured in this way includes a BD-ROM drive 1, a read buffer 2, a demultiplexer 3, a video decoder 4, a video plane 5, a sound processor 6, a sound processor 7, a mixer 8, a sound controller 9, a D/A converter 10, an Interactive Graphics decoder 11, an Interactive Graphics plane 12, a Presentation Graphics decoder 13, a Presentation Graphics plane 14, a JPEG decoder 15, a Still plane 16, a Still plane control unit 17, combining units 18a, 18b, and 18c, a STC-DELTA addition unit 19, an ATC-DELTA addition unit 20, a local storage 21, an instruction ROM 22, a user event processing unit 23, a PSR set 24, a CPU 25, a scenario memory 26, and a local memory 27.

The BD-ROM drive 1 loads/ejects the BD-ROM, and accesses the BD-ROM.

The read buffer 2 is a FIFO (First In First Out) memory in which TS packets read from the BD-ROM are stored on a first-in first-out basis.

The demultiplexer (De-MUX) 3 reads Source packets from the read buffer 2 and converts TS packets which constitute the Source packets, to PES packets. Among the PES packets obtained by the conversion, PES packets having PIDs (Packet IDentifiers) written in an STN_Table are output to any of the video decoder 4, the audio decoder 6, the Interactive Graphics decoder 11, and the Presentation Graphics decoder 13. Source packets and an STN_Table will be described in detail later.

The video decoder 4 decodes a plurality of PES packets output from the demultiplexer 3 to obtain pictures in an uncompressed format, and writes these pictures to the video plane 5.

The video plane 5 is for storing uncompressed pictures. A plane is a memory area, in the playback device 100, for storing one screen worth of pixel data. The video plane stores data written by the video decoder, and outputs the stored data. The video plane 5 has a 1920×1080 resolution, with stored picture data being constituted from pixel data expressed by 16-bit YUV. In the video plane 5, playback video in a video stream can be scaled per frame. Scaling involves changing a playback image per frame to either ¼ (quarter screen) or 1/1 (full screen) of the entire video plane 5. Such scaling is executed in a BD-J mode in accordance with an instruction from the CPU 25, enabling screen production whereby a playback image of a video stream is relegated to a corner of the screen or projected over the whole screen.

The sound processor 6 includes an audio buffer 6a and an audio decoder 6b. The audio buffer 6a stores, when PES packets constituting an audio stream are output from the PID filter 3, these PES packets. The audio decoder 6b decodes PES packets stored in the audio buffer 6a, and outputs audio data in a PCM (Pulse Code Modulation) state.

The sound processor 7 includes a preload buffer 7a and an audio decoder 7b. The preload buffer 7a preloads files sound.bdmv read from the BD-ROM. The audio decoder 7b decodes sound data specified by the CPU 25 among a plurality of pieces of sound data in the preloaded files sound.bdmv, and outputs audio data in a PCM state. The preloading to the preload buffer 7a is preferably performed at the time of BD-ROM loading or Title switching. This is because reading a file sound.bdmv during playback of an AVClip causes a seek of an optical pickup for reading a file different from the AVClip to occur. The playback of the AVClip is rarely performed at the time of BD-ROM loading or Title switching. Accordingly, by reading a file sound.bdmv with this timing, an interruption in AVClip playback can be avoided.

The sound mixer 8 mixes sound data in a PCM state output from the sound processor 6 and the sound processor 7.

The sound controller 9 switches data to be output between decompressed audio data output from the sound mixer 8 and compressed audio data that has not passed the sound processor 6. When outputting the compressed audio data, the compressed audio data is decoded by the device (the television) that receives the data.

The D/A conversion unit 10 converts the audio data output from the sound mixer 8 from digital to analog, and outputs the analog audio data.

The I-Graphics (IG) decoder 11 decodes an IG stream read from the BD-ROM or the local storage 21 and writes uncompressed graphics to the Interactive Graphics plane 12.

The Interactive Graphics (IG) plane 12 is written with uncompressed graphics resulting from the decoding by the I-Graphics decoder 11 in the HDMV mode. Also, the Interactive Graphics (IG) plane 12 is written with characters and graphics drawn by an application in the BD-J mode.

The P-Graphics decoder 13 decodes a PG stream read from the BD-ROM or the local storage 21 and writes uncompressed graphics to the Presentation Graphics (PG) plane 11. Subtitles appear on the screen as a result of combining data decoded by the P-Graphics decoder 13 and written to the Presentation Graphics plane 11.

The Presentation Graphics plane 14, being a memory with a storage area for one screen worth of data, is able to store one screen worth of uncompressed graphics.

The JPEG decoder 15 decodes JPEG data recorded on the BD-ROM or the local storage 21 and writes the decoded JPEG data to the Still plane 16.

The Still plane 16 is a plane for storing uncompressed graphics data obtained by expanding JPEG data. This graphics data is used as the so-called "wallpaper" of a GUI framework drawn by a Java™ application.

The Still plane control unit 17 controls data output from the Still plane 16. In detail, upon receiving a scaling instruction from the CPU 25 with respect to the video plane 5, if the scaling instruction indicates full-screen display on the whole television 130, the Still plane control unit 17 suppresses reading of data from the Still plane 16. If the scaling instruction indicates quarter-screen display which is ¼ of the full-scale display, on the other hand, the Still plane control unit 17 has the stored Still data output from the Still plane 16 to the combining unit 18c.

The combining units 18a, 18b, and 18c combine data stored on the Interactive Graphics plane 12, data stored on the Presentation Graphics plane 11, data stored on the video plane 5, and data stored on the Still plane 16, and outputs an image signal of a resulting composite image. Each combining unit directly outputs an image signal output from one plane without performing the combination if no image signal is output from the other plane.

The STC_delta addition unit 19 generates a STC (System Time Clock). Also, when switching a current STC_Sequence, the STC_delta addition unit 19 adds an offset value called STC_delta to an STC value (STC1) of the current STC_Sequence to thereby obtain an STC value (STC2) of a new STC_Sequence, so that the STC value (STC1) of the current STC_Sequence and the STC value (STC2) of the new STC_Sequence are continuous.

STC_delta can be expressed as $$STC\_delta = PTS1(1stEND) + Tpp - PTS2(2ndSTART)$$

where PTS1(1stEND) denotes a display start time of a picture that is played back last in an STC_Sequence, and PTS2(2ndSTART) denotes a display start time of a picture that is played back first in a following STC_Sequence. The STC_delta addition unit 19 obtains STC_delta in the above way, adds STC_delta to a clock measurement value, and outputs the result to each decoder. This enables each decoder to play back streams corresponding to two STC_Sequences continuously. With this construction, even if two or more STC_Sequences are included in one AVClip or even if two or more AVClips to be played back consecutively include different STC_Sequences, decoding between these STC_Sequences can be performed seamlessly.

To achieve continuous buffering, the following conditions 1) and 2) need be satisfied:

1) STC2(2ndSTART)>STC2(1stEND), and
2) Extraction of a TS packet from TS1 and extraction of a TS packet from TS2 are defined by STC1 and STC2 that are projected on a same time axis, and no underflow or overflow of the buffer occurs.

In the above 1), STC2(1stEND) denotes STC1(1stEND) projected on a time axis of STC2, and is given by an equation STC2(1stEND)=STC1(1stEND)−STC_delta.

The ATC_delta addition unit 20 generates an ATC (Arrival Time Clock). Also, when switching a current ATC_Sequence, the ATC-delta addition unit 20 adds an offset value called ATC_delta to an ATC value (ATC1) of the current ATC_Sequence so that the ATC value (ATC1) of the current ATC_Sequence and an ATC value (ATC2) of a new ATC_Sequence are continuous. This addition yields ATC2=ATC1+ATC_delta. ATC_delta is an offset value being a difference between T1 and T2, where T1 is a time at which a last TS packet of a current transport stream (TS1) that has been read up to now is input, and T2 is a time at which a top TS packet of the next transport stream (TS2) is input. ATC_delta is given by an expression "ATC_delta≧N1/TS_recording_rate". It should be noted here that the input time T2 means the input time of the top TS packet of TS2 that is projected on a time axis of TS1. Also, N1 indicates a number of TS packets that follow a last video PES packet of TS1. In the BD-ROM, ATC_delta is written in Clip information. ATC_delta can be obtained by using this data. The above calculation enables the ATC value (ATC1) of the current ATC_Sequence to be continuous to the ATC value (ATC2) of the new ATC_Sequence. As a result of outputting a clock measurement value to which ATC_delta has been added to the demultiplexer (De-MUX) 3, seamless buffer controls can be achieved.

The construction elements relating to playback of AVClips are as described above. The following describes construction elements (the local storage 21 to the local memory 27) relating to operations in the BD-J mode.

The local storage 21 is a hard disk for storing content supplied from communication media and recording media other than the BD-ROM, such as content downloaded from a website, together with metadata. The metadata is information for binding and managing downloaded content in the local storage 21. By accessing the local storage 21, an application in the BD-J mode can perform a variety of processes using the downloaded content.

The following describes construction elements for realizing collective controls in the playback device (the instruction ROM 22 to the local memory 26).

The instruction ROM 22 stores software that defines controls relating to the playback device.

The user event processing unit 23, in response to a key operation of the remote control or the front panel of the playback device, outputs a user event for performing a corresponding operation to the CPU 25.

The PSR (Player Status Register) set 24 is a set of registers internal to the playback device, and is composed of 64 PSRs and 4096 GPRs (General Purpose Registers). PSR4 to PSR8 are used to express a current playback point.

PSR4 indicates a Title of the current playback point as a result of having been set to a value from 1 to 100. Setting PSR4 to 0 indicates that the current playback point is a top menu.

PSR5 indicates a chapter number of the current playback point as a result of having been set to a value from 1 to 999. Setting PSR5 to 0xFFFF indicates a null chapter number in the playback device.

PSR6 indicates a number of a PlayList (current PL) to which the current playback point belongs as a result of having been set to a value from 0 to 999.

PSR7 indicates a number of a PlayItem (current PlayItem) to which the current playback point belongs as a result of having been set to a value from 0 to 255.

PSR8 indicates the current playback point (current PTM (Presentation TiMe)) using 45 KHz time accuracy, as a result of having been set to a value from 0 to 0xFFFFFFFF. These PSR4 to PSR8 enable the current playback point to be identified on a time axis of the entire BD-ROM shown in FIG. 19A.

The CPU 25 runs software stored in the instruction ROM 22 to execute controls relating to the entire playback device. These controls change dynamically depending on user events output from the user event processing unit 23 and each PSR value in the PSR set 24.

The scenario memory 26 is for storing current PL information and current Clip information. The current PL information is a piece of PL information recorded on the BD-ROM that is currently targeted for processing. The current Clip information is a piece of Clip information recorded on the BD-ROM that is currently targeted for processing.

The local memory 27 is a cache memory for temporarily storing the recorded contents of the BD-ROM, given a low reading speed from the BD-ROM. The provision of the local memory 27 allows an application in the BD-J mode to run efficiently.

The hardware construction of the playback device according to this embodiment is as described above.

<Software Construction of the Playback Device 100>

The following describes a software construction of the playback device according to this embodiment.

Figure 3:
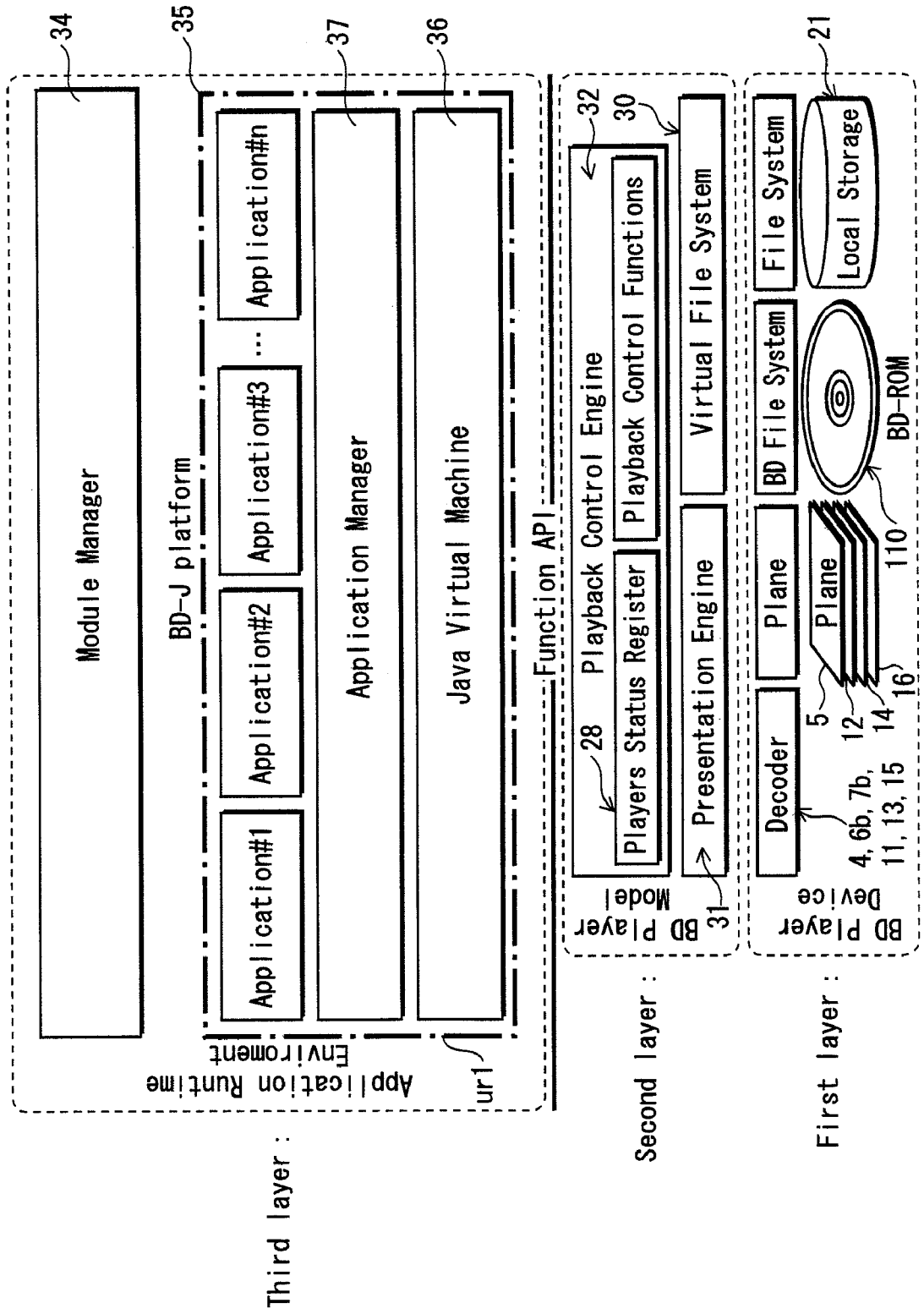
FIG. 3 shows software and hardware in a layer structure.

FIG. 3 depicts construction elements composed of hardware and software stored on the ROM 24 rearranged in a layer structure. As shown in FIG. 3, the layer structure of the playback device is composed of a) a first layer (BD Player Device), b) a second layer (BD Player Model), and c) a third layer (Application Runtime Environment).

The hardware construction of the playback device shown in FIG. 2 belongs to the first layer. The "BD Player Device" at the first layer in FIG. 3 includes a "decoder" composed of the video decoder 4, the I-Graphics decoder 11, the audio decoder 6, and the like, a "plane" composed of the video plane 5, the Interactive Graphics plane 12, and the like, the BD-ROM 110 and its file system, and the local storage 21 and its file system.

The "BD Player Model" at the second layer is composed of b1) a layer for a Presentation Engine 31 and a Virtual File System 30 and b2) a layer for a Playback Control Engine 32, with API functions being provided in relation to higher layers.

The "Application Runtime Environment" at the third layer is composed of c1) a layer that includes a module manager 34 and c2) a layer that includes a BD-J platform 35.

First, the Virtual File System 30 belonging to the second layer to the module manager 34 are described below.

The Virtual File System 30 is a virtual file system for treating downloaded content stored on the local storage 21 as one unit with disc content on the BD-ROM. The downloaded content stored on the local storage 21 includes SubClips, Clip information, and PlayList information. The PlayList information in the downloaded content differs from PlayList information on the BD-ROM in that it can specify both Clip information on the BD-ROM and Clip information on the local storage 21. To make this specification, the PlayList information on the Virtual File System 30 need not specify a file on the BD-ROM or the local storage 20 by a full path. This is because a file system on the BD-ROM or the local storage 20 is recognized as one virtual file system (Virtual File System 30). Therefore, by designating a five-digit value which is a file body of a file storing Clip information, a Clip_Information_file_name in PlayItem information is able to specify an AVClip on the Virtual File System 30 or the BD-ROM. Data read via the Virtual File System 30 from the local storage 21, when combined dynamically with data recorded on the BD-ROM, can produce various playback patterns. Since disc content obtained by combining the local storage 21 and the BD-ROM is treated equally to disc content on the BD-ROM, in this embodiment the term "BD-ROM" also refers to a virtual recording medium that is a combination of the local storage 21 and the BD-ROM.

The Presentation Engine 31 executes AV playback functions. The AV playback functions of a playback device are a traditional group of functions inherited from DVD players and CD players, including playback start (Play), playback stop (Stop), pause (Pause On), pause clear (Pause Off), Still function clear (still Off), fast forward at designated speed (Forward Play(speed)), rewind at designated speed (Backward Play(speed)), audio switching (Audio Change), subtitle switching (Subtitle Change), and angle switching (Angle Change). To realize these AV playback functions, the Presentation Engine 31 controls the video decoder 4, the P-Graphics Decoder 13, the I-Graphics Decoder 10, and the audio decoder 6 to decode a portion of an AVClip read to the read buffer 2 that corresponds to a desired time. By having the place indicated by PSR8 (current PTM) decoded as the desired time, arbitrary points in an AVClip can be rendered playable.

The Playback Control Engine (PCE) 32 executes various functions including (i) playback controls on PlayLists and (ii) acquiring/setting the statuses in the PSR set 23. The playback control function for PlayLists involves having the Presentation Engine 31 execute playback start and playback stop out of the above AV playback functions, in accordance with current PL information and Clip information. These functions (i) and (ii) are executed according to function calls from the HDMV module 33—the BD-J platform 35.

The module manager 34 holds Index.bdmv read from the BD-ROM, and performs a branch control. The branch control includes issuing a Terminate event to a dynamic scenario constituting a current Title, and issuing an Activate event to a dynamic scenario constituting a branch destination Title.

Up to now, the Presentation Engine 31 to the module manager 34 have been explained. The following describes the BD-J platform 35.

The BD-J platform 35 is the so-called Java™ platform, having a construction centering on a Java™ virtual machine 36. The BD-J platform 35 implements BD-J Extension, in addition to the aforementioned Java™ 2 Micro_Edition (J2ME) Personal Basis Profile (PBP1.0) and Globally Executable MHP specification (GEM[1.0.2]) for package media targets. The BD-J Extension includes various packages that are specialized to provide improved functions of GEM [1.0.2] to the BD-J platform.

First, the Java™ virtual machine 36 that is the core of the BD-J platform 35 is described below.

<Java™ Virtual Machine 36>

Figure 4:
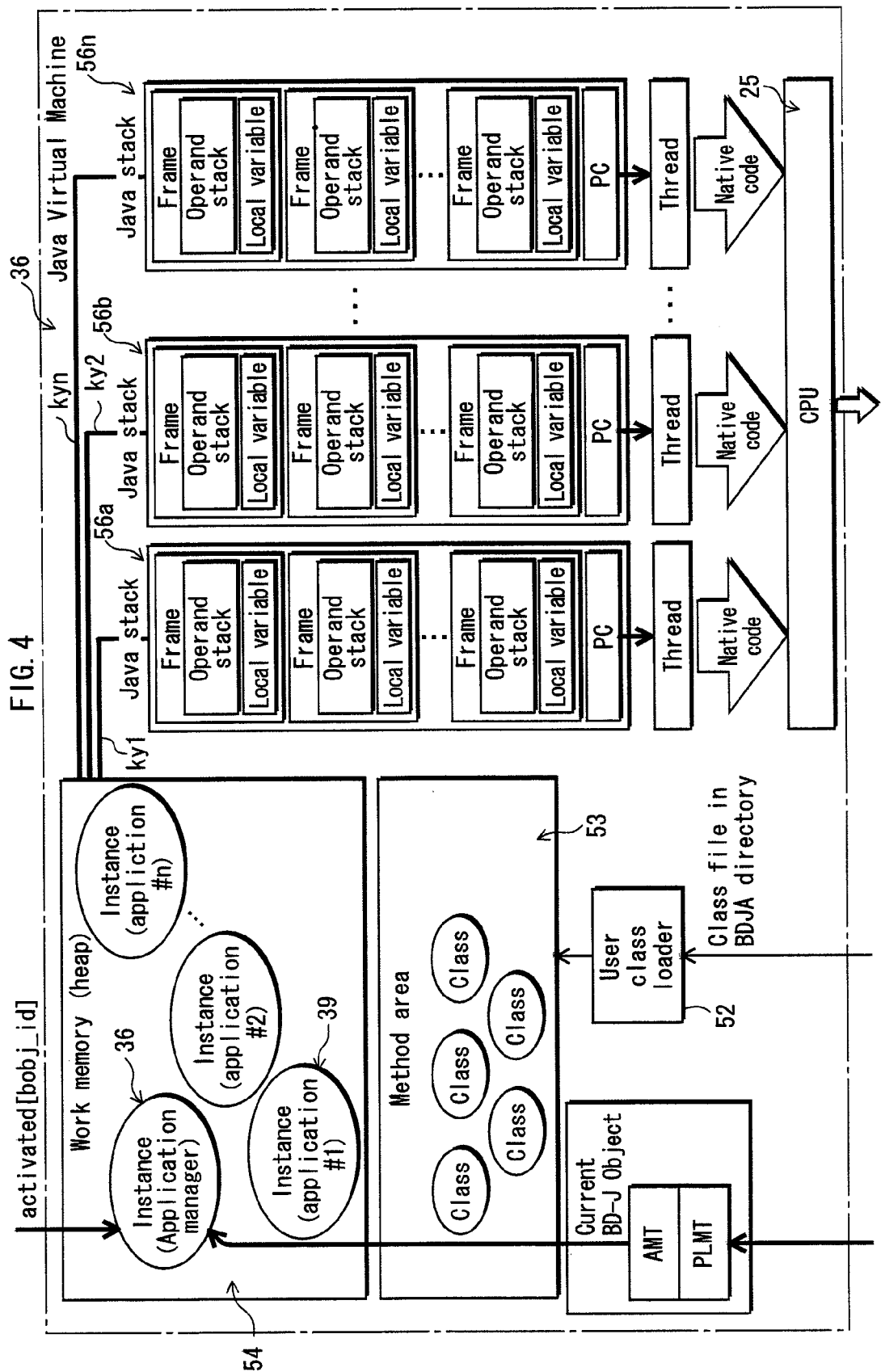
FIG. 4 shows a functional construction of a Java™ virtual machine 36.

FIG. 4 shows an internal structure of the Java™ virtual machine 36. As shown in FIG. 4, the Java™ virtual machine 36 is constituted from the CPU 25 shown in FIG. 2, a user class loader 52, a method area 53, a work memory 54, threads $55a, 55b, \ldots, 55n$, and Java™ stacks $56a, 56b, \ldots, 56n$.

The user class loader 52 reads class files in Java™ archive files in a BDJA directory from the local memory 26 or the like and stores the read class files in the method area 53. The reading of a class file by the user class loader 52 is performed as a result of an application manager 37 sending a read instruction specifying a file path to the user class loader 52. If the file path indicates the local memory 26, the user class loader 52 reads a class file in a Java™ archive file constituting an application from the local memory 26 to the work memory 54. If the file path indicates a directory in the Virtual File System 30, the user class loader 52 reads a class file in a Java™ archive file constituting an application from the BD-ROM or the local storage 20 to the work memory 54. An application activation control is realized by this class file reading by the user class loader 52. If a class file to be read does not exist on the local memory 26, the user class loader 52 notifies the application manager 37 of a read error.

The method area 53 stores class files read from the local memory 27 by the user class loader 52.

The work memory 54 is a so-called heap area storing instances of various class files. The application manager 37 shown in FIG. 3 is a resident application always present on the work memory 54. The work memory 54 stores instances corresponding to resident applications and class files read to the method area 53. Such an instance is an xlet program constituting an application that is made executable by placing the xlet program in the work memory 54.

In the layer model shown in FIG. 3, the application manager 37 on the work memory 54 is located in a layer that is higher than the Java™ virtual machine 36. However, this is an arrangement made to describe the application manager 37 on the work memory 54 to be easy to understand. In reality, the application manager 37 and the application are executed as instances by the threads 55a, 55b, . . . , 55n.

The threads 55a, 55b, . . . , 55n are logical execution entities for executing methods stored in the work memory 54. These threads perform calculations using local variables and arguments stored in operand stacks as operands, and store calculation results in local variables or operand stacks. The arrows ky1, ky2, . . . , kyn in FIG. 4 symbolically indicate the supply of methods from the work memory 54 to the threads 55a, 55b, . . . , 55n. Whereas the CPU is the sole physical execution entity, there may be up to 64 logical execution entities or threads in the Java™ virtual machine 36. Threads can be newly created and existing threads deleted within this numerical limit, and the number of operational threads can be varied while the Java™ virtual machine 36 is operating. Being able to appropriately increase the number of threads also makes it possible to run one instance using a plurality of threads in parallel, and thereby speed up the execution of instances. In FIG. 4, the relationship between the CPU 25 and the threads is "one-to-many". However, this relation may be "many-to-many" where there are a plurality of CPUs. The execution of the methods by the threads 55a, 55b, . . . , 55n is achieved by converting byte code that constitutes the methods into native code for the CPU 25, and issuing the native code to the CPU 25.

The Java™ stacks 56a, 56b, . . . , 56n exist in a one-to-one ratio with the threads 55a, 55b, . . . , 55n, and each has a program counter ("PC" in the drawing) and one or more frames. The program counters show which part of an instance is currently being executed. A frame is a stack-type area allocated to each call for a method, and is composed of an operand stack for storing arguments occurring at the time of the call and a local variable stack ("local variable" in the drawing) for use by the called method. Since frames are stacked on the Java™ stacks 56a, 56b, . . . , 56n whenever a call is made, the frames of a method that calls itself recursively also get stacked one on top of the other.

The internal structure of the Java™ virtual machine is as described above.

<Application Manager 37>

The application manager 37 is described next. The application manager 37 is system software that operates on the work memory in the Java™ virtual machine 36. Each time a branch between Titles occurs, the application manager 37 instructs the Java™ virtual machine 36 to start an application that is not running in a branch source Title but has the run attribute "AutoRun" for a branch destination Title. At the same time, the application manager 37 terminates an application that is running in the branch source Title but has no life cycle in the branch destination Title. Such start-up control and termination control are performed by referring to the application management table for the current BD-J Object.

<Structure of the BD-ROM>

The following describes data recorded on the BD-ROM 110.

Figure 5:
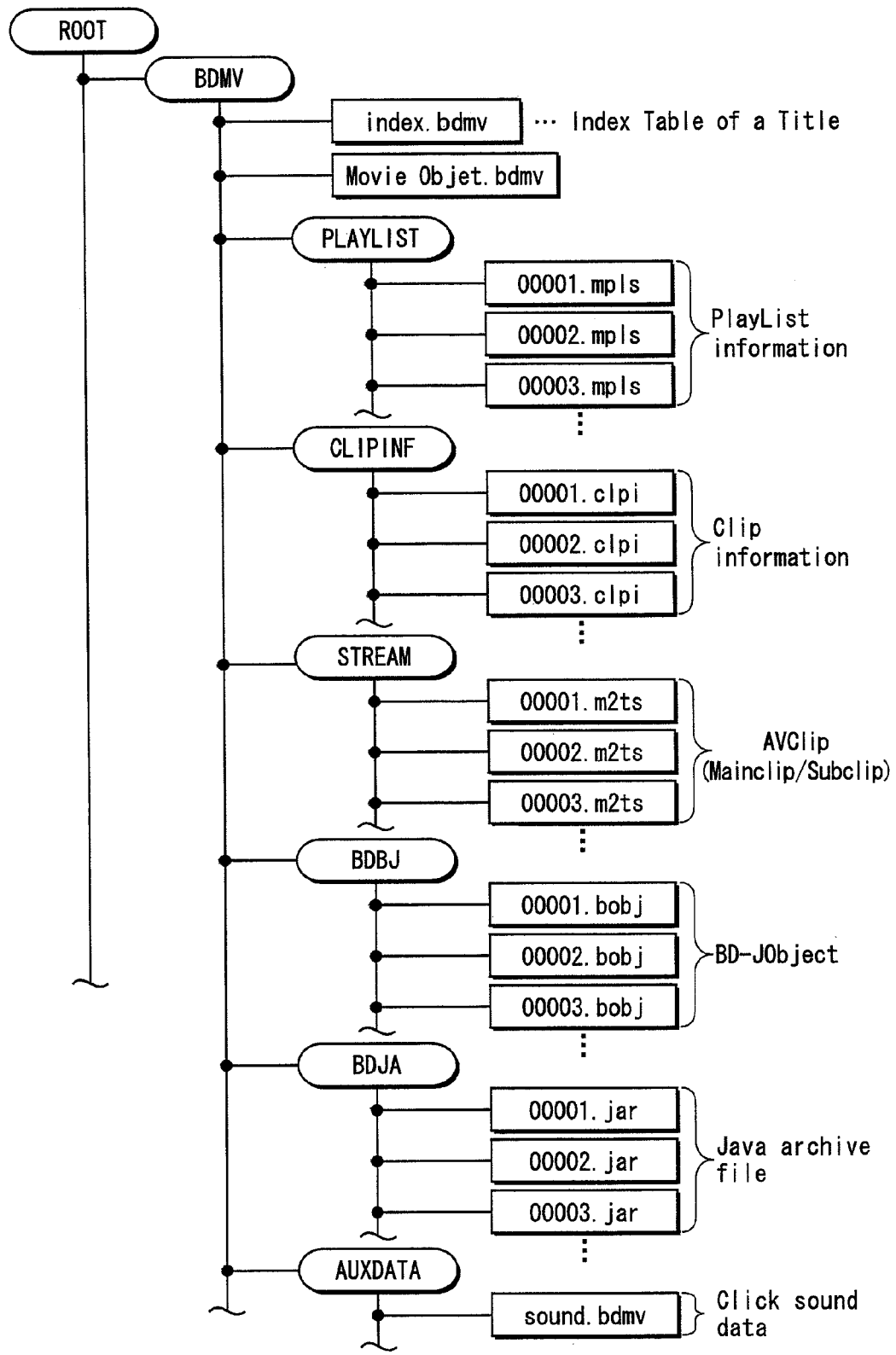
FIG. 5 shows a directory structure of data stored on a BD-ROM 110.

First, a file/directory structure of the data on the BD-ROM 110 is described below, with reference to FIG. 5. As shown in FIG. 5, a BDMV directory is placed under a ROOT directory in the BD-ROM 110.

The BDMV directory stores files to which an extension bdmv is assigned (index.bdmv, MovieObject.bdmv). Also, under the BDMV directory exist six subdirectories known as a PLAYLIST directory, a CLIPINF directory, a STREAM directory, a BDBJ directory, a BDJA directory, and an AUXDATA directory.

The PLAYLIST directory stores files (00001.mpls, 00002.mpls, 00003.mpls) with an extension mpls.

The CLIPINF directory stores files (00001.clpi, 00002.clpi, 00003.clpi) with an extension clpi.

The STREAM directory stores files (00001.m2ts, 00002.m2ts, 00003.m2ts) with an extension m2ts.

The BDBJ directory stores files (00001.bobj, 00002.bobj, 00003.bobj) with an extension bobj.

The BDJA directory stores files (00001.jar, 00002.jar, 00003.jar) with an extension jar. This directory structure indicates that a plurality of files of different types are arranged on the BD-ROM.

The AUXDATA directory stores a file sound.bdmv.

<BD-ROM Structure, Part 1: AVClip>

Figure 6:
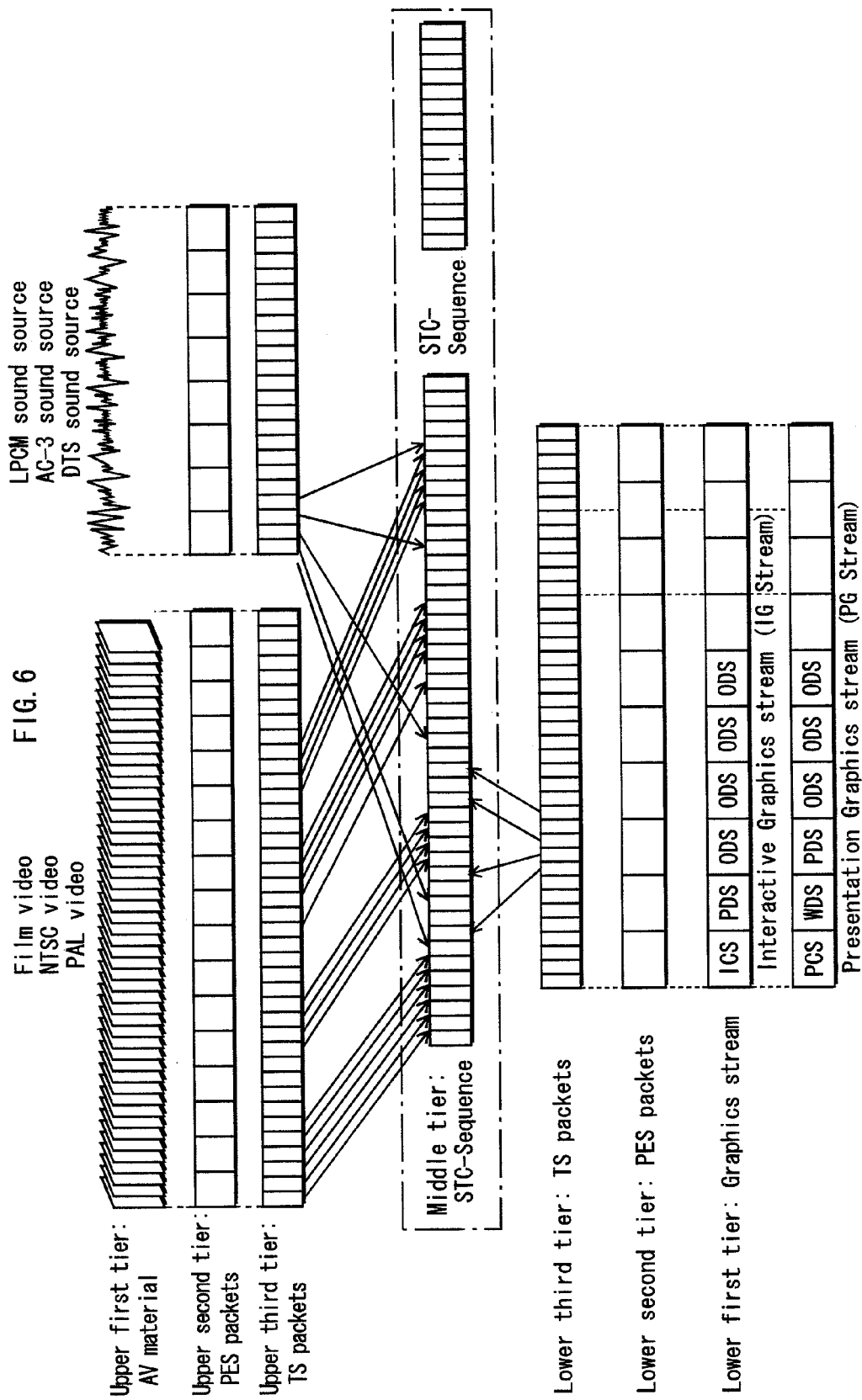
FIG. 6 shows a structure of a file to which an extension .m2ts is attached.

Firstly, a file with the extension .m2ts is described below. FIG. 6 schematically shows how the file with the extension .m2ts is structured. The file with the extension .m2ts (00001.m2ts, 00002.m2ts, 00003.m2ts, . . . ) stores an AVClip. The AVClip is a digital stream in compliance with the MPEG2-Transport Stream format. This digital stream is generated by converting digital video, which is obtained by digitizing film video, NTSC (National Television Standards Committee) video, PAL (Phase Alternation by Line) video, or the like, and digital audio, which is obtained by digitizing a LPCM (Linear Pulse Code Modulation) sound source, an AC-3 sound source, a DTS (Digital Surround) sound source, or the like (upper first tier), to elementary streams made up of PES packets (upper second tier) and then to TS packets (upper third tier), similarly converting a Presentation Graphics (PG) stream for subtitles and an Interactive Graphics (IG) stream for interaction (lower first tier) to PES packets (lower second tier) and then to TS packets (lower third tier), and finally multiplexing these TS packets.

The PG stream is an elementary stream that achieves display of subtitles in line with the progress of playback of a moving image. The IG stream is an elementary stream that achieves a GUI in line with the progress of playback of a moving image. Since the IG stream and the PG stream are not the main features of the present invention, their explanation has been omitted here.

In the video stream, a playback unit (for example, picture) that is played back in one PTS is called "Video Presentation Unit". In the audio stream, a playback unit that is played back in one PTS is called "Audio Presentation Unit".

The PES packets constituting the AVClip also constitute one or more "STC_Sequences". A "STC_Sequence" is a sequence of PES packets, with the values of the System Time Clock (STC) referred to by their PTSs and DTSs having no STC discontinuity point (system time-base discontinuity). Since it is a necessary requirement for the STC_Sequence that it does not include an STC discontinuity point, one STC_Sequence is constituted from a sequence of PES packets that starts with a PES packet that includes a PCR (Program Clock Reference) and is immediately after an STC discontinuity point and ends with a PES packet immediately before the next STC discontinuity point.

<Clip Information>

Figure 7:
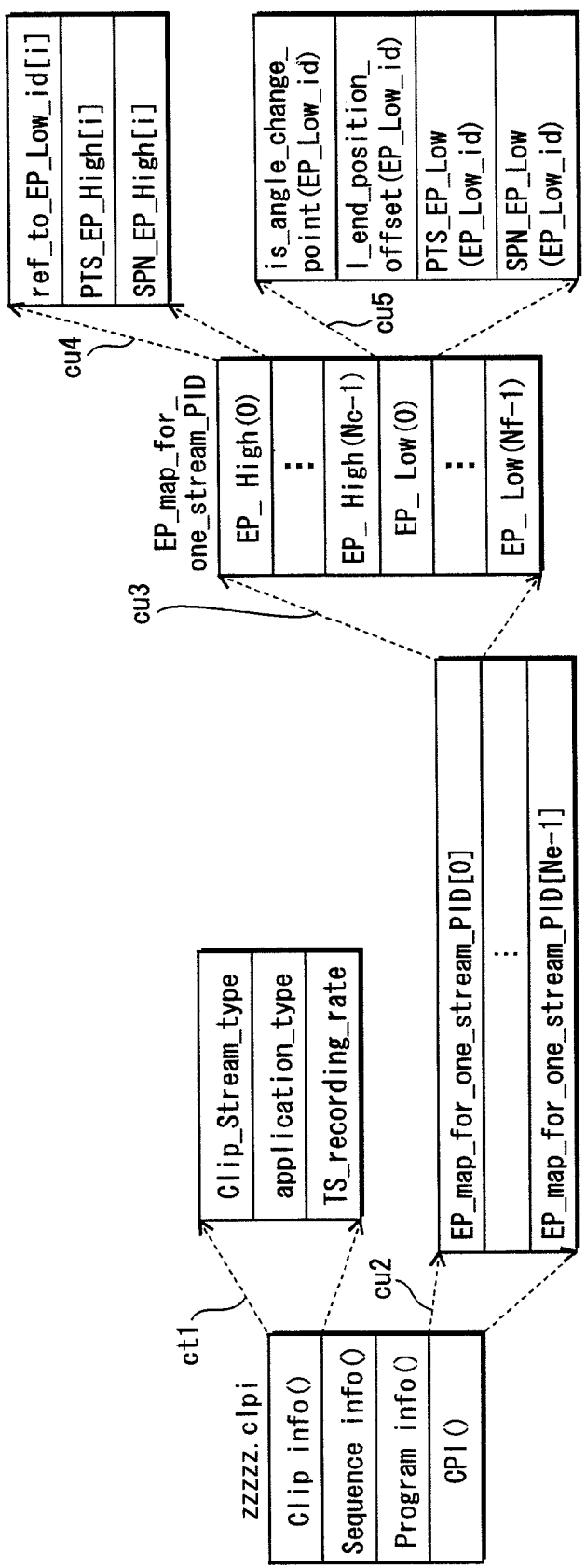
FIG. 7 shows a structure of Clip information.

A file with the extension .clpi is explained next. The file with the extension clpi (00001.clpi, 00002.clpi, 00003.clpi, . . . ) stores Clip information. The Clip information is management information corresponding to each individual AVClip. FIG. 7 shows an internal structure of the Clip information. As shown on the left side of the drawing, the Clip information is made up of i) "ClipInfo( )" storing information about the AVClip, ii) "Sequence Info( )" storing information about an ATC Sequence and an STC Sequence, iii) "Program Info ( )"

storing information about a Program Sequence, and iv) "Characteristic Point Info(CPI( ))".

The Sequence Info is information pertaining to one or more STC-Sequences and ATC-Sequences included in the AVClip. This information is provided to notify the playback device of a discontinuity point of the STC and the ATC beforehand. If a discontinuity point exists, there is a possibility that PTSs or PCRs of a same value may appear in the AVClip. This causes a problem when performing playback. Thus, the Sequence Info is provided to show in which part of a transport stream the STC and the ATC are continuous.

The Program Info is information showing a section (Program Sequence) where the contents of a Program are constant. The Program referred to here is a group of elementary streams that share a time axis for synchronous playback. The Program Sequence information is provided to notify the playback device of a point of change in the Program contents beforehand. The point of change in the Program contents referred to here is, for example, a point where a video stream PID changes or a point where a video stream type changes from SDTV (Standard Definition TeleVision) to HDTV (High-Definition TeleVision).

The Characteristic Point Info is explained next. The arrows cu2 in FIG. 7 show a close-up of a structure of the CPI. As shown by the arrows cu2, the CPI is made up of Ne number of EP_map_for_one_stream_PIDs (EP_map_for_one_stream_PID(0) to EP_map_for_one_stream_PID(Ne−1)). These EP_map_for_one_stream_PIDs are each an EP_map corresponding to an individual elementary stream which belongs to the AVClip. An EP_map is information that shows, on one elementary stream, a correspondence between a packet number (SPN_EP_start) of an entry position where an Access Unit Delimiter exists and an entry time (PTS_EP_start). The arrows cu3 in the drawing show a close-up of an internal structure of an EP_map_for_one_stream_PID.

As illustrated, the EP_map_for_one_stream_PID is made up of Nc number of EP_Highs (EP_High(0) to EP_High(Nc−1)) and Nf number of EP_Lows (EP_Low(0) to EP_Low(Nf−1)). An EP_High has a role of indicating a higher-order bit of an SPN_EP_start and PTS_EP_start of the Access Unit (Non-IDR I picture, IDR picture). An EP_Low has a role of indicating a lower-order bit of the SPN_EP_start and PTS_EP_start of the Access Unit (Non-IDR I picture, IDR picture).

The arrows cu4 in FIG. 7 show a close-up of an internal structure of the EP_High. As shown by the arrows cu4, an ER_High(i) is composed of a "ref_to_EP_Low_id[i]" that is a reference value to an EP_Low, a "PTS_EP_High[i]" that indicates a higher-order bit of a PTS of the Access Unit (Non-IDR I picture, IDR picture), and a "SPN_EP_High[i]" that indicates a higher-order bit of an SPN of the Access Unit (Non-IDR I picture, IDR picture). Here, "i" is an identifier that identifies a given EP_High.

The arrows cu5 in FIG. 7 show a close-up of a structure of the EP_Low. As shown by the arrows cu5, the EP_Low is composed of a "is_angle_change_point(EP_Low_id)" that indicates whether or not the corresponding Access Unit is an IDR picture, an "I_end_position_offset(EP_Low_id)" that indicates a size of the corresponding Access Unit, a "PTS_EP_Low(EP_Low_id)" that indicates a lower-order bit of the PTS of the corresponding Access Unit (Non-IDR I picture, IDR picture), and a "SPN_EP_Low(EP_Low_id)" that indicates a lower-order bit of the SPN of the corresponding Access Unit (Non-IDR I picture, IDR picture). Here, the EP_Low_id is an identifier that identifies a given EP_Low.
<Clip Information, Part 2: EP_Map>

Figure 8:
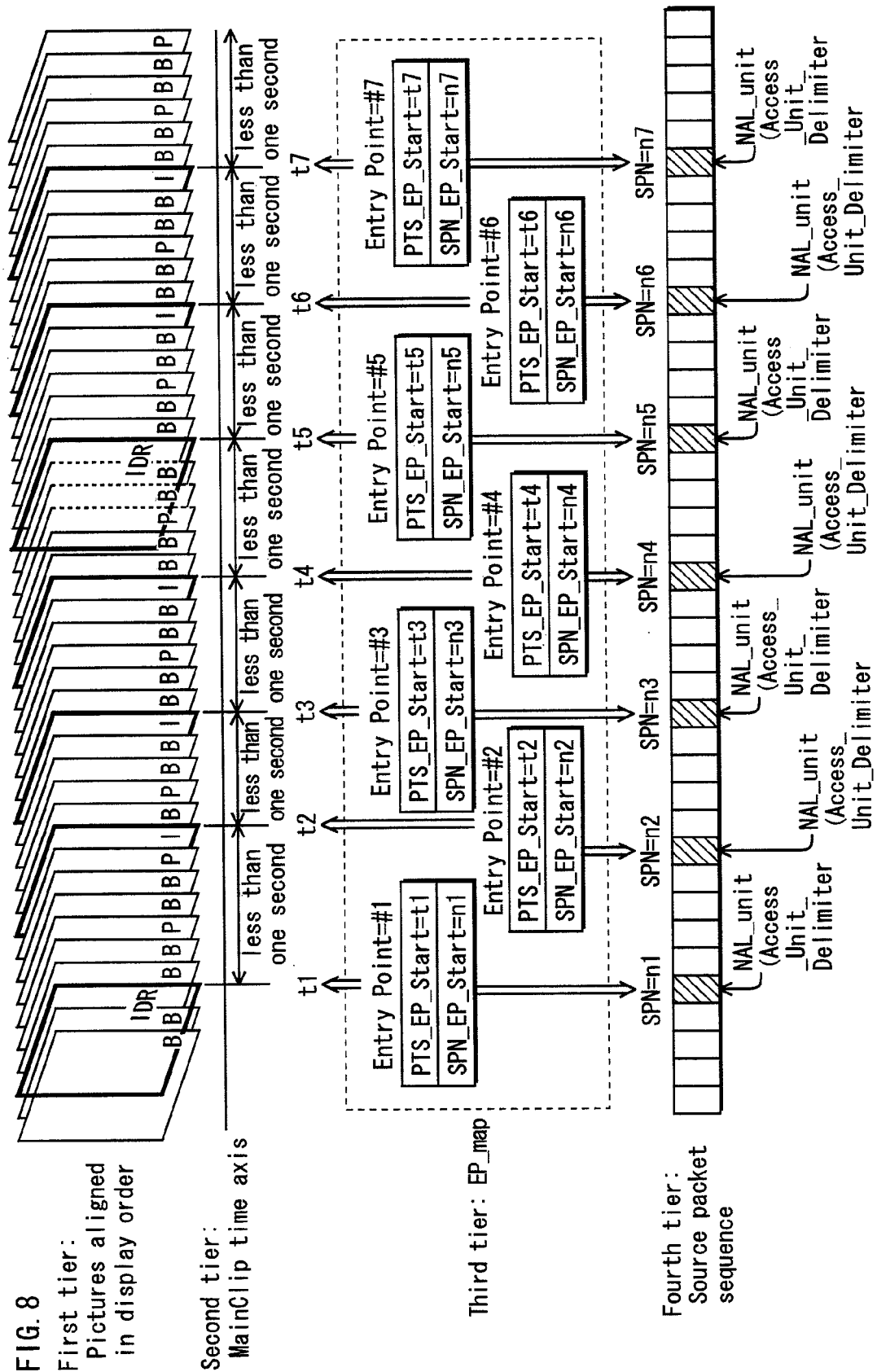
FIG. 8 shows EP-map settings for a video stream of a movie.

The EP_map is explained below, using a specific example. FIG. 8 shows EP_map settings on a video stream of a movie. The first tier shows a plurality of pictures (B pictures, IDR Pictures, and P pictures defined in MPEG4-AVC) arranged in a display order. The second tier shows a time axis of these pictures. The fourth tier indicates a TS packet sequence on the BD-ROM, and the third tier indicates settings of the EP_map.

It is presumed here that in the time axis of the second tier an IDR picture which is an Access Unit is present at the points t1 to t7. Suppose an interval between adjacent ones of t1 to t7 is approximately one second. The EP_map used for the movie is set to indicate t1 to t7 as entry times (PTS_EP_start), and indicate entry positions (SPN_EP_start) in association with the entry times.
<PlayList Information>

The PlayList information is explained next. The file with the extension "mpls" (00001.mpls) is a file storing PlayList (PL) information. The PlayList information defines a presentation path called a MainPath and playback information corresponding to this presentation path, as a PlayList (PL).

Figure 9:
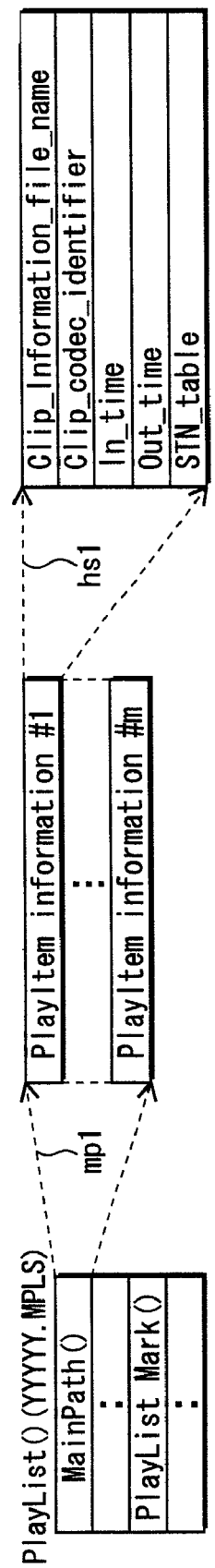
FIG. 9 shows a data structure of PlayList information.

FIG. 9 shows a data structure of the PlayList information. As shown in FIG. 9, the PlayList information includes Main-Path information (MainPath( )) defining a MainPath, and PlayListMark information (PlayListMark( )) defining a chapter.

The MainPath is a presentation path defined on a main AVClip. Meanwhile, a Subpath is a presentation path defined on a SubClip. The SubClip referred to here is an AVClip that does not include a video stream constituting a moving image.
<PlayList Information, Part 1: MainPath Information>

The MainPath is described firstly. The MainPath is a presentation path that is defined for an audio stream and a video stream as main video.

The MainPath is defined by a plurality of pieces of Play-Item information #1, . . . , #m, as shown by the arrows mp1. The PlayItem information defines one logical playback section constituting the MainPath. The arrows hs1 show a close-up of a structure of the PlayItem information. As shown by the arrows hs1, the PlayItem information includes a "Clip_Information_file_name" showing a filename of playback section information of an AVClip to which an IN point and an Out point of the playback section belong, a "Clip_codec_identifier" showing a coding method of the AVClip, an "In_time" which is time information showing a start point of the playback section, an "Out_time" which is time information showing an end point of the playback section, and an "STN_table".

Figure 10:
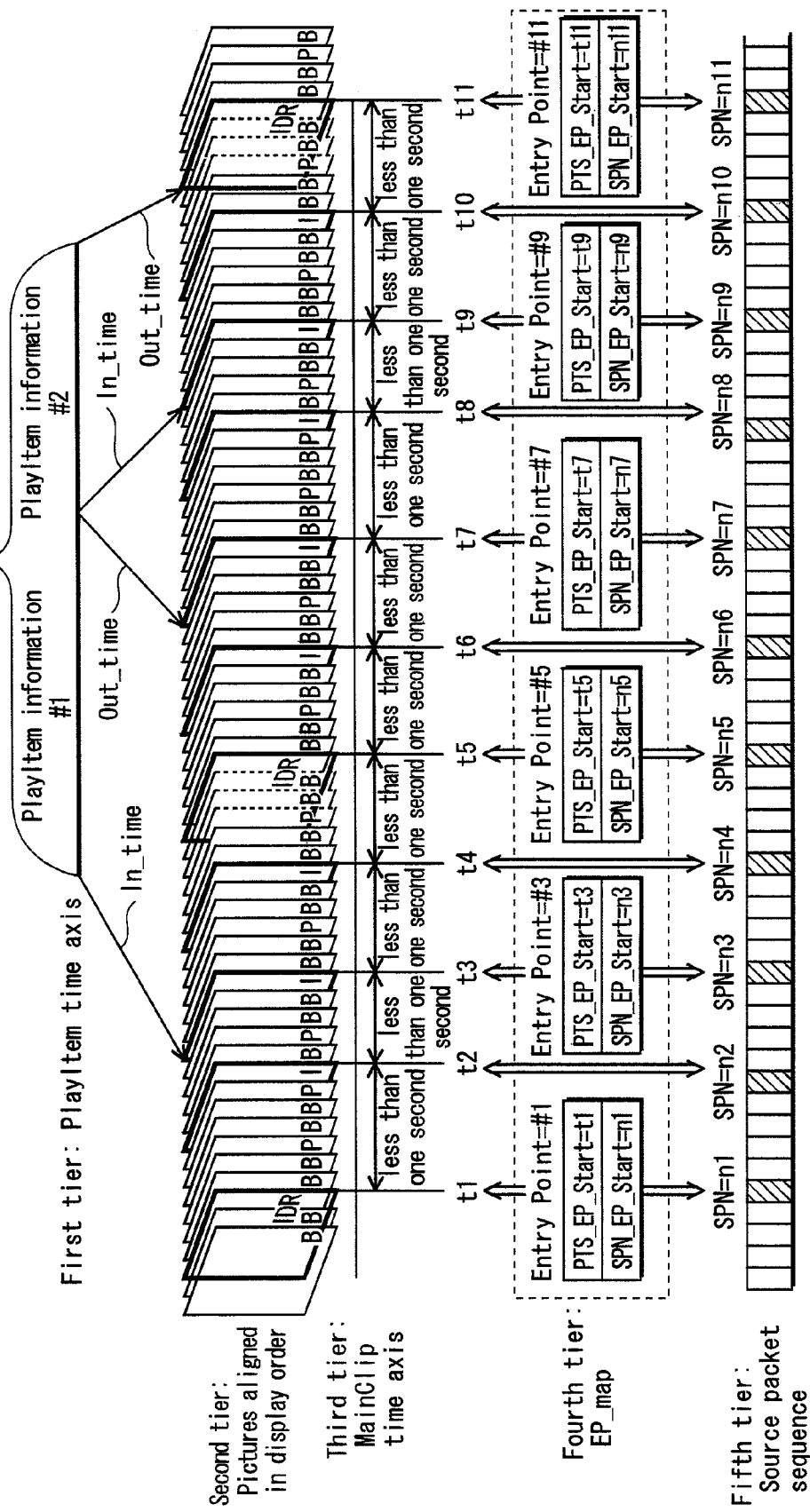
FIG. 10 shows a relationship between an AVClip and PlayList information.

FIG. 10 shows a relationship between an AVClip and Play-List information. The first tier shows a time axis of the PlayList information. The second to fifth tiers show a video stream (same as the one shown in FIG. 6) referenced in an EP_map.

The PlayList information includes two pieces of PlayItem information #1 and #2, with two playback sections being defined by In_times and Out_times of these two pieces of PlayItem information #1 and #2. A different time axis from the AVClip is defined when these playback sections are arranged in line. This is the PlayItem time axis shown at the first tier. Defining a different time axis from the AVClip is thus enabled by the definitions in the PlayItem information.
<STN_table>

The STN_table is a table showing playable streams which are available for presentation, among elementary streams multiplexed in the AVClip specified by the Clip_Information_file_name of the PlayItem information. In detail, the STN_table is formed by associating an entry of each of the elementary streams with an attribute.

FIG. 11 shows an internal structure of the STN_table. As shown in the drawing, the STN_table includes a plurality of combinations of entries and attributes (entry-attribute), and shows numbers of entry-attribute combinations (number_ of_video_stream_entries, number_of_audio_stream_entries, number_of_PG_textST_stream_entries, number_of_IG_stream_entries).

The entry-attribute combinations correspond to a video stream, an audio stream, a PG_textST_stream, and an IG stream that are playable in the PlayItem, as indicated by the parenthesis "{".

The entry-attribute combinations are explained in detail below. FIG. 11 shows the details of the entry-attribute combinations.

Figure 12A:
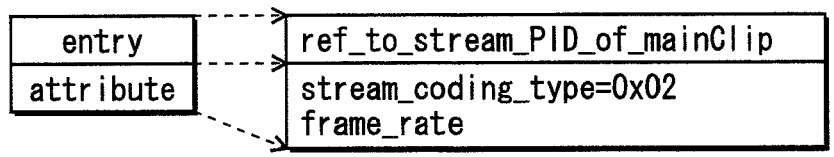
FIGS. 12A to 12D show details of entry-attribute.

FIG. 12A shows an entry-attribute combination corresponding to a video stream.

The entry for a video stream includes a "ref_to_stream_PID_of_mainClip" that indicates a PID used to extract the video stream when the AVClip is demultiplexed.

The attribute for a video stream includes a "stream_coding_type" set to 0x02 and a "frame_rate" that indicates a display rate of the video stream.

Figure 12B:
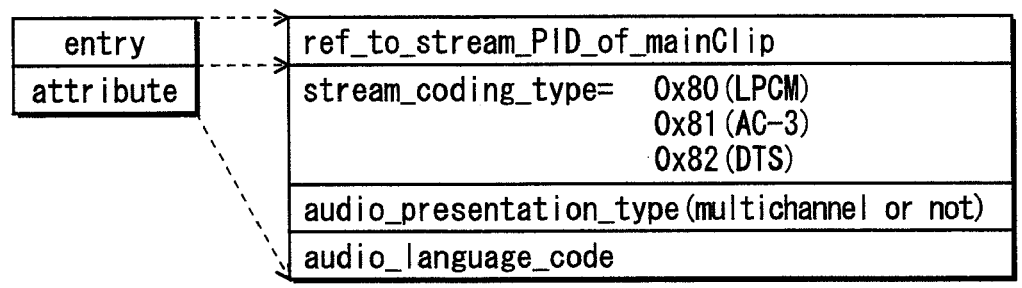

FIG. 12B shows an entry-attribute combination corresponding to an audio stream.

The entry for an audio stream includes a "ref_to_stream_PID_of_mainClip" that indicates a PID used to extract the audio stream when the AVClip is demultiplexed.

The attribute for an audio stream includes a "stream_coding_type" that is set to any of 0x80 (Linear PCM), 0x81 (AC-3), and 0x82 (DTS) to indicate a coding type of the audio stream, an "audio_presentation_type" that indicates a channel structure of the corresponding audio stream to indicate whether or not multi-channel output is available, and an "audio_language_code" that indicates a language attribute of the corresponding audio stream.

The multi-channel includes stereo sound as well as 5.1CH surround sound. In the following description, it is supposed that the multi-channel means only 5.1CH surround sound.

Figure 12C:
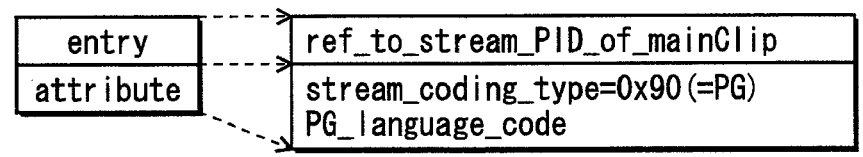

FIG. 12C shows an entry-attribute combination corresponding to a PG stream.

The entry for a PG stream includes a "ref_to_stream_PID_of_mainClip" that indicates a PID used to extract the PG stream when the AVClip is demultiplexed.

The attribute for a PG stream includes a "stream_coding_type" that is set to 0x90 to indicate a codec of the PG stream, and a "PG_language_code" that indicates a language attribute of the corresponding PG stream.

Figure 12D:
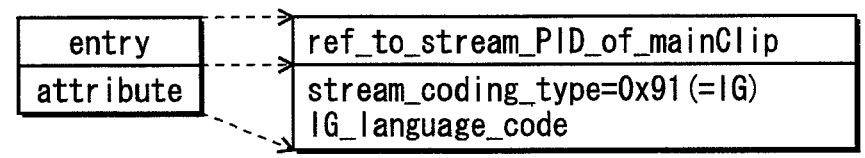

FIG. 12D shows an entry-attribute combination corresponding to an IG stream.

The entry for an IG stream includes a "ref_to_stream_PID_of_mainClip" that indicates a PID used to extract the IG stream when the AVClip is demultiplexed.

The attribute for an IG stream includes a "stream_coding_type" that is set to 0x91 to indicate a codec of the IG stream, and a "language_code" that indicates a language attribute of the corresponding IG stream.

<PlayList Information, Part 2: PlayListMark>

The PlayItem information according to this embodiment is as described above. The following describes PlayListMark information.

Figure 13:
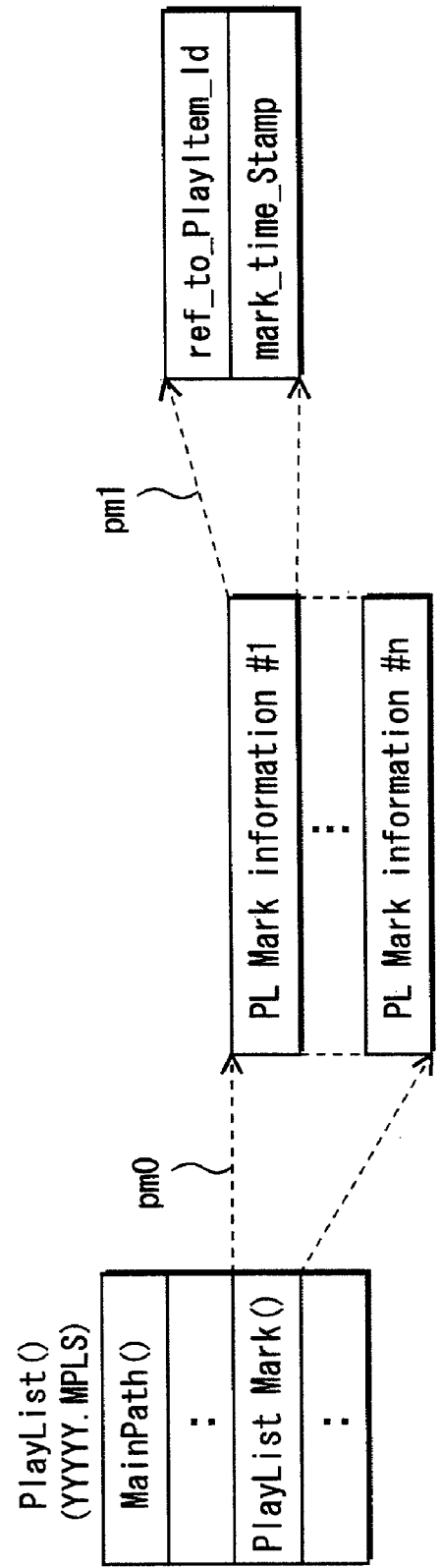
FIG. 13 shows an internal structure of PlayListMark information in PlayList information.

FIG. 13 shows an internal structure of the PlayListMark information in the PlayList information. As shown by the arrows pm0 in the drawing, the PlayListMark information includes a plurality of pieces of PLMark information (#1 to #n). The PLMark information (PLMark ( )) specifies a given section on the PL time axis as a chapter. As shown by the arrows pm1, the PLMark information includes a "ref_to_PlayItem_Id" which indicates a PlayItem as a target of chapter specification, and a "mark_time_stamp" which indicates a chapter position in the PlayItem using the time notation.

Figure 14:
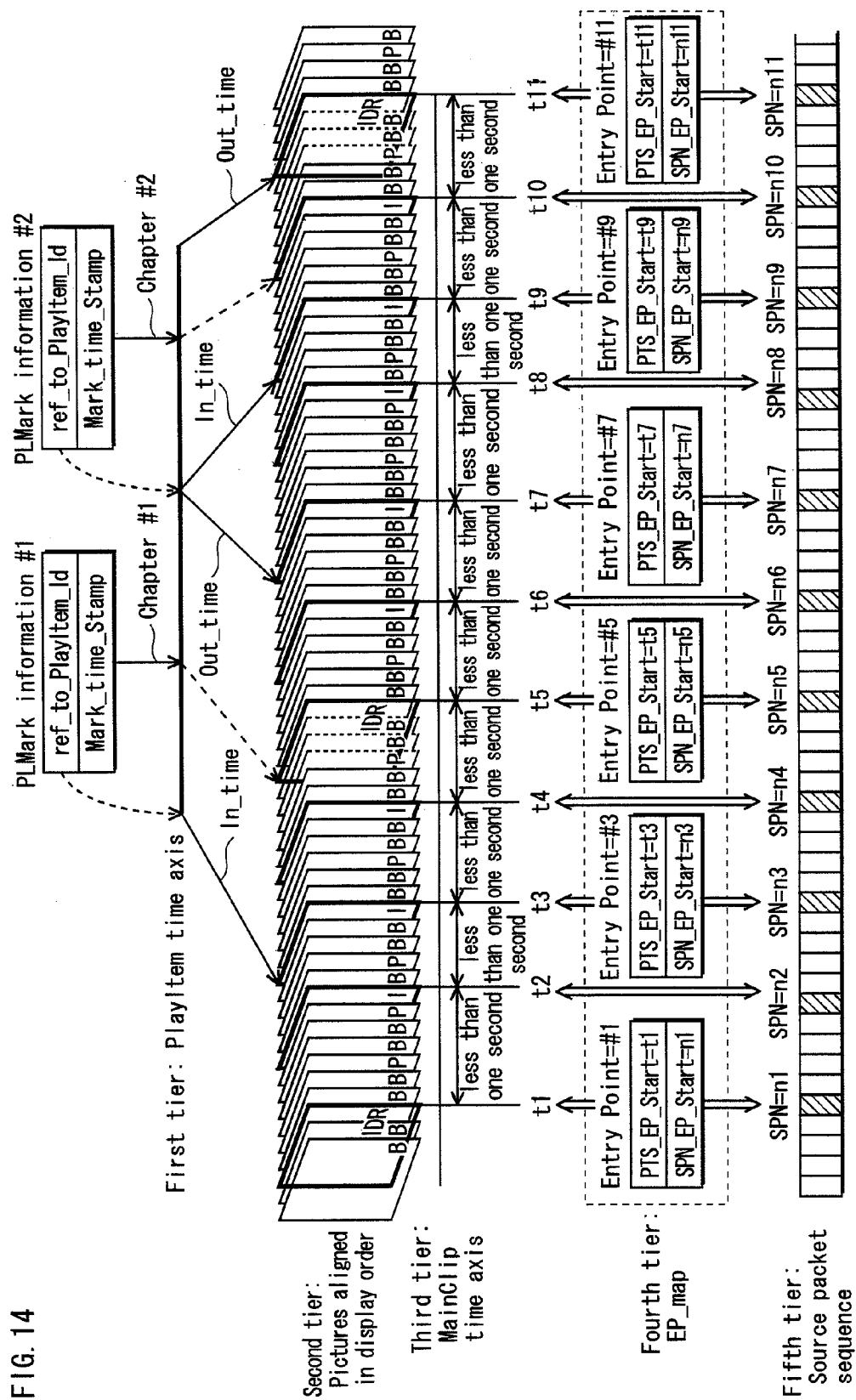
FIG. 14 shows designation of chapter positions by PlayListMark information in PlayList information.

FIG. 14 shows how chapter positions are specified by the PLMark information in the PlayList information. The second to fifth tiers in the drawing show the EP_map and AVClip shown in FIG. 10.

The first tier in the drawing shows the PLMark information and the PL time axis. Two pieces of PLMark information #1 and #2 are shown in the first tier. The arrows kt1 and kt2 indicate specifications by the ref_to_PlayItem_Id in the PLMark information. As can be understood from these, the ref_to PlayItem_Id in the PLMark information specifies each piece of PlayItem information. Also, the Mark_time_stamp indicates the times of Chapters #1 and #2 on the PlayItem time axis. In this way, the PLMark information defines a chapter point on the PlayItem time axis.

The PlayList information in BD-ROMs has the feature of enabling definition of asynchronous section in which an AVClip and a SubClip can be synchronized. Clip information and PlayList information described above are classified as "static scenarios". This is because a PlayList which is a static unit of playback is defined by the above Clip information and PlayList information. This completes the description of the static scenarios.

The following describes "dynamic scenarios". A dynamic scenario is scenario data that dynamically specifies playback controls on AVClips. The word "dynamic" indicates that the contents of playback controls change due to user key events and status changes in the playback device. BD-ROMs assume two modes as operation environments of such playback controls. One is an operation environment similar to an operation environment of DVD playback devices, and a command-based execution environment. The other is an operation environment of Java™ virtual machines. The former operation environment is called an HDMV mode, whereas the latter operation environment is called a BD-J mode. Since there are these two operation environments, dynamic scenarios are written while assuming either of the two operation environments. A dynamic scenario based on the HDMV mode is called a Movie Object, whilst a dynamic scenario based on the BD-J mode is called a BD-J. Object.

A Movie Object is described firstly.

<Movie Object>

The Movie Object is stored in the file MovieObject.bdmv shown in FIG. 5, and contains a navigation command sequence.

The navigation command sequence is made up of commands such as a command for realizing a conditional branch, a command for setting a status register in the playback device, and a command for acquiring a set value of a status register. A command describable in the Movie Object is shown below.

1) PlayPL Command

Form: PlayPL (first argument, second argument), where the first argument can designate a PlayList to be played back using a PlayList number, and the second argument can designate a playback start position using a PlayItem included in the PlayList or an arbitrary time, Chapter, and Mark in the PlayList.

A PlayPL function designating a playback start position on a PL time axis by a PlayItem is called a PlayPLatPlayItem( ), a PlayPL function designating a playback start position on a PL time axis by a Chapter is called a PlayPLatChapter( ), and a PlayPL function designating a playback start position on a PL time axis by time information is called a PlayPLatSpecifiedTime( ).

2) JMP Command

Form: JMP argument, where the JMP command is used for a branch that discards a currently executed dynamic scenario and executes a branch destination dynamic scenario that is specified by the argument. The JMP command has two types: a direct reference type that directly specifies the branch destination dynamic scenario; and an indirect reference type that indirectly refers to the branch destination dynamic scenario.

The description of navigation commands in Movie Objects is similar to that of navigation commands in DVDs. Accordingly, an operation of moving disc content on a DVD to a BD-ROM can be carried out efficiently. For further details on Movie Objects, see the following International Publication which describes a conventional technique for Movie Objects.

International Publication: WO 2004/074976

This completes the description of Movie Objects. The following describes BD-J Objects.

<BD-J Object>

A BD-J Object is a dynamic scenario in the BD-J mode which is described in a Java™ programming environment, and is stored in files 00001.bobj to 00003.bobj.

FIG. 15 shows an internal structure of a BD-J Object. The BD-J Object includes an application management table (AMT) and a PlayList management table (PLMT). The difference from a Movie Object lies in that a command is not directly written in the BD-J Object. In the Movie Object, a control procedure is directly written using navigation commands. In the BD-J Object, on the other hand, a control procedure is indirectly specified by writing designation to a Java™ application in an application management table. By such indirect specification, control procedure sharing, i.e., sharing a control procedure across a plurality of dynamic scenarios, can be efficiently conducted.

Also, the PlayList playback in the Movie Object is performed by writing a navigation command (PlayPL command) for instructing the PlayList playback, but the PlayList playback in the BD-J Object can be described by incorporating a PlayList management table showing a PlayList playback procedure into the BD-J Object.

A Java™ application in the BD-J mode is described below. Here, a Java™ platform envisioned by the BD-J mode fully implements Java™ 2 Micro_Edition(J2ME) Personal Basis Profile (PBP 1.0) and Globally Executable MHP specification (GEM1.0.2) for package media targets.

The Java™ application in the BD-J mode is controlled by an Application Manager through an xlet interface. The xlet interface has four statuses that are "loaded", "paused", "active", and "destroyed".

The aforementioned Java™ platform includes a standard Java™ library for displaying JFIF (JPEG), PNG, and other image data. Hence the Java™ application can achieve a GUI framework that differs from a GUI realized by an IG stream in the HDMV mode. The GUI framework in the Java™ application contains a HAVi (Home Audio/Video interoperability) framework defined by GEM 1.0.2, and includes a remote control navigation mechanism in GEM 1.0.2.

Thus, the Java™ application enables screen displays where button displays, text displays, and online displays (the contents of BBS) based on the HAVi framework are combined with video displays. This allows the user to perform operations on these screen displays using the remote control.

An actual Java™ application is a Java™ archive file (00001.jar, 00002.jar) stored in the BDJA directory under the BDMV directory shown in FIG. 5. Java™ archive files are described below with reference to FIG. 16.

<Java™ Archive File>

A Java™ archive file (00001.jar, 00002.jar in FIG. 5) is a collection of one or more class files and data files etc, and constitutes a Java™ application that is to run in the BD-J mode.

Figure 16:
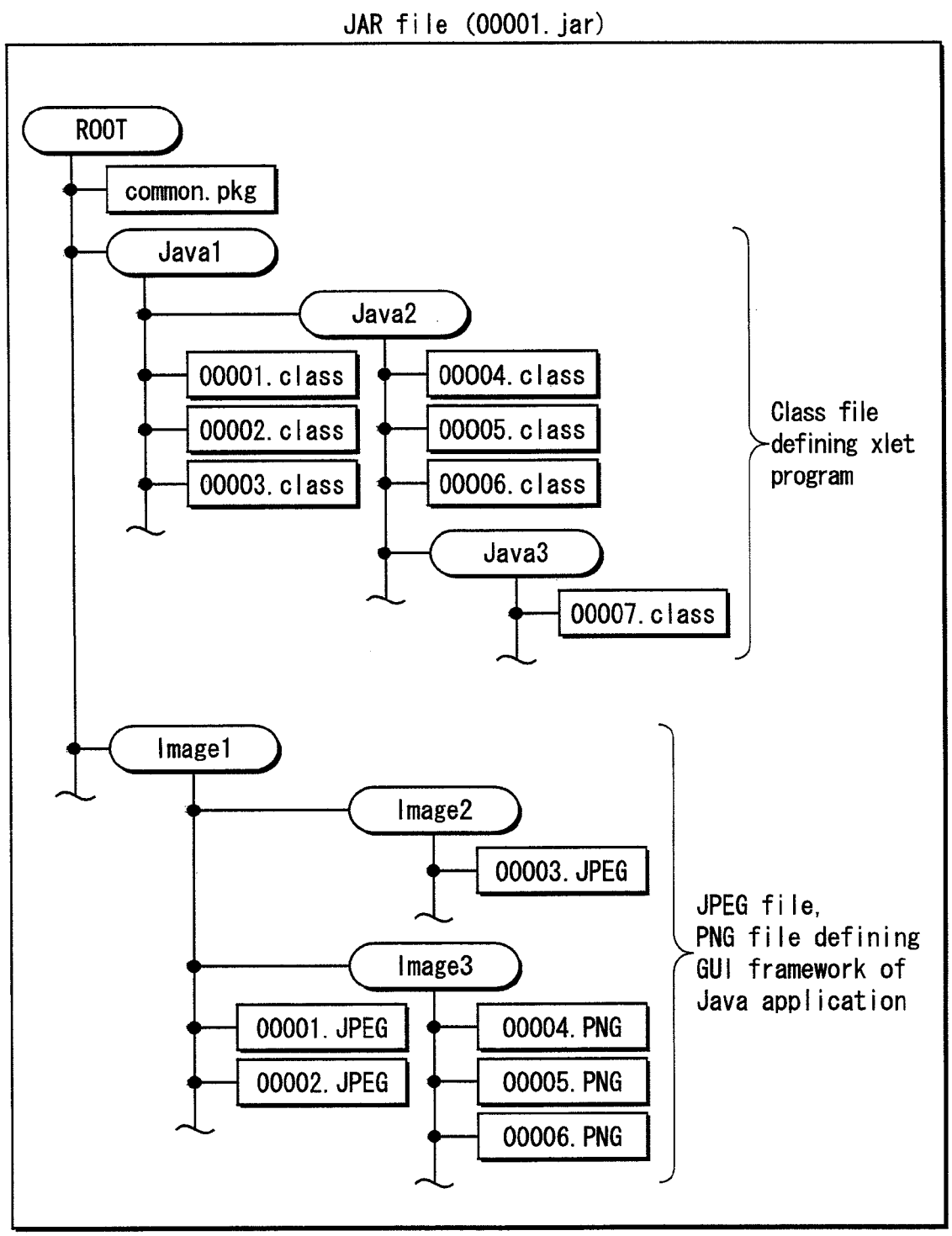
FIG. 16 shows programs and data stored in archive files.

FIG. 16 shows programs and data collected in the archive file. The programs and data in the drawing are a plurality of files collected by a Java™ archiver and arranged into a directory structure shown within the frame. This directory structure includes a Root directory, Java™ 1, 2, and 3 directories, and Image 1, 2, and 3 directories, with a common.pkg file, class files (00001.class to 00007.class), and 0001.JPEG to 00003.JPEG and 00004.PNG to 00006.PNG files being placed within the respective directories. The Java™ archive file is a result of the Java™ archiver having collected these files together. The class files and data are expanded when read from the BD-ROM to a cache, and treated in the cache as a plurality of files existing in directories. The five-digit numeric "zzzzz" in the filename of the Java™ archive file shows an ID of an application (application ID). By referring to this numeric in the filename when the Java™ archive file has been read to the cache, it is possible to extract data as well as programs constituting an arbitrary Java™ application.

Though this embodiment describes the case where the programs and data that constitute the application are stored in the Java™ archive file, such programs and data may instead be stored in an LZH file or a zip file.

This completes the description of dynamic scenarios in the BD-J mode.

<Index.bdmv>

Index.bdmv is a table that indicates a Movie Object or a BD-J Object constituting a Title.

Index.bdmv defines the Movie Object or the BD-J Object that is a component of a Title.

For more details on Index.bdmv, see the following International Publication:

International Publication WO 2004/025651 A1.

The following describes each of the application management table and the PlayList management table shown in FIG. 15 in more detail.

<Application Management Table>

The application management table (AMT) is described first. The application management table (AMT) is a table implemented with the "application signaling" in the above-mentioned GEM 1.0.2 for package media targets. The "application signaling" is a control for starting and executing an application using a "service" as a life cycle of the application in the MHP (Multimedia Home Platform) defined by GEM 1.0.2. The application management table of this embodiment achieves the control for starting and executing an application, by specifying a "Title" in the BD-ROM, instead of the "service", as the life cycle of the application.

FIG. 17A shows an internal structure of the application management table. As shown in the drawing, the application management table is composed of a "life cycle", an "apli_id_ref", a "run_attribute", and a "run_priority".

FIG. 17B shows meanings of the information elements that constitute the application management table.

The "life_cycle" indicates a "life cycle" of the application.

The "apli_id_ref" indicates, by a reference value being written therein in correspondence with an "application identifier", the application that has the above-mentioned life cycle. The application identifier is represented by the five-digit numeric "zzzzz" that is provided in the Java™ archive file as the filename. This five-digit numeric value is written in the "apli_id_ref".

The "run_attribute" indicates a "run attribute" of the application during the life cycle. The run attribute is classified into AutoRun, Present, and Suspend.

The "run_priority" indicates a "run priority" of the application during the life cycle. The BD-J Object controls the operation of the application using these information.

<Life Cycle>

The life cycle, which is defined in the application management table, is described below.

The life cycle means a cycle during which an application lives on the work memory of the virtual machine, on a time axis of the entire content recorded on the BD-ROM. Here, the term "live" refers to the state where an xlet program constituting the application has been loaded in the work memory in the Java™ virtual machine such that the application can be executed by the Java™ virtual machine.

When an application is run on a Java™ Virtual Machine, it is important to clearly define, on the time axis, the start and end points of a service by the application. These start and end points of a service are defined by the life cycle in the application management table.

Figure 18:
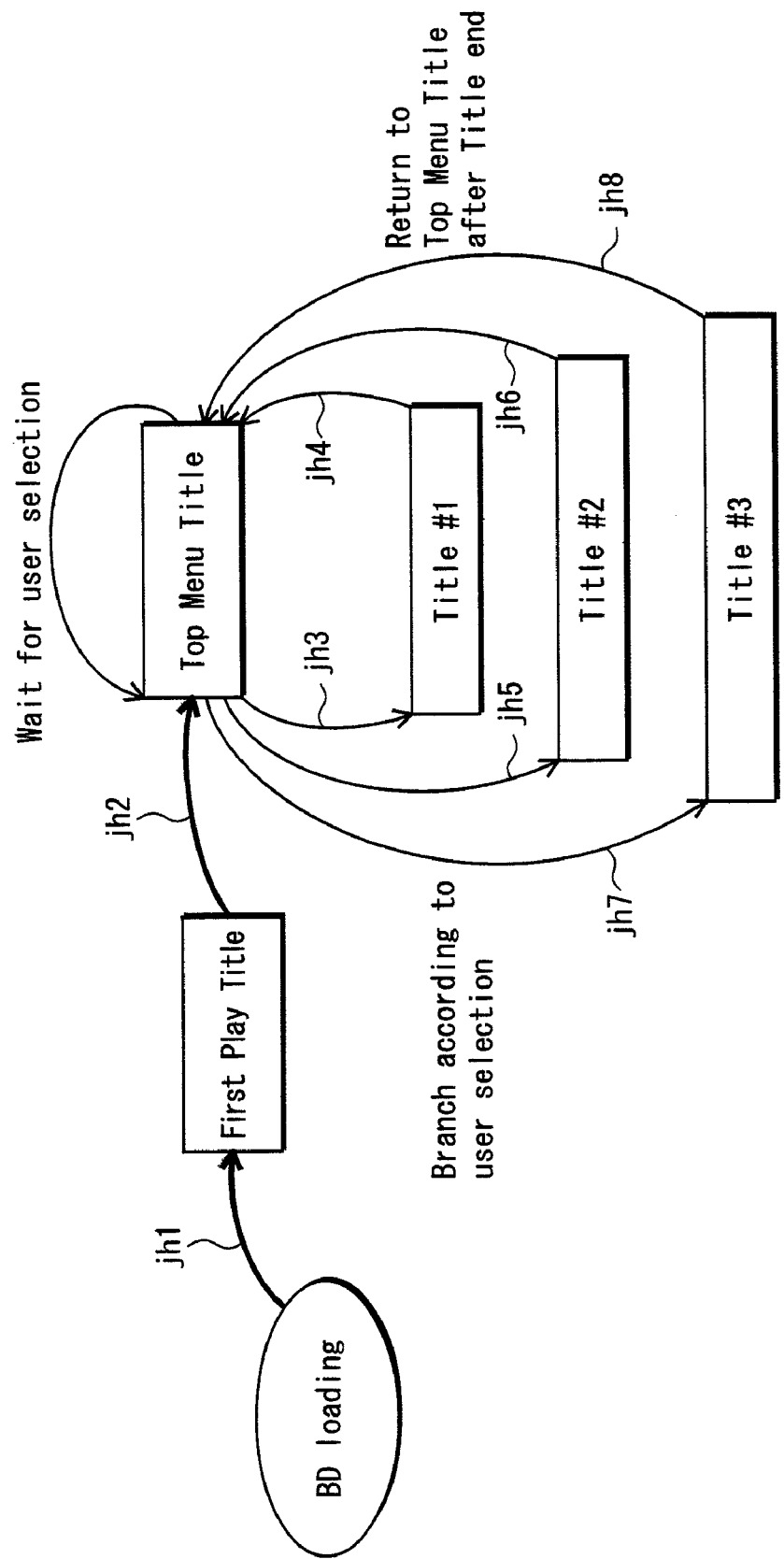
FIG. 18 shows status transitions in disc content.

On the other hand, disc content provided on a read-only disc such as a DVD-Video has a structure that centers on a top menu Title. A status transition in such disc content is unique in that the playback branches from the top menu Title to each work and then returns to the top menu Title. FIG. 18 shows a status transition in disc content. The boxes in FIG. 18 represent Titles. A Title is a playback unit that corresponds to a "status" in the status transition unique to the disc content, and is used as the life cycle of a Java™ application.

Titles are classified into a "FirstPlayTitle" that is played back first when the BD-ROM is loaded, a "Top_menuTitle" that constitutes the top menu, and a "Title" that is a general title other than the top menu. The arrows jh1, jh2, jh3, jh4, jh5, jh6, jh7, and jh8 in the drawing symbolically indicate branches between Titles. According to the status transition shown in the drawing, the "FirstPlayTitle" is played back upon the loading of the BD-ROM, a branch to the "Top_menuTitle" occurs, and then a selection on the top menu is waited for.

In the status transition unique to the disc content, the following operations are repeated until the BD-ROM is ejected: a Title selected by the user on the top menu is played back; and after the selected Title is played back, the screen returns to the top menu Title.

Figure 19A:
FIG. 19A shows a time axis of an entire BD-ROM.
Figure 19B:
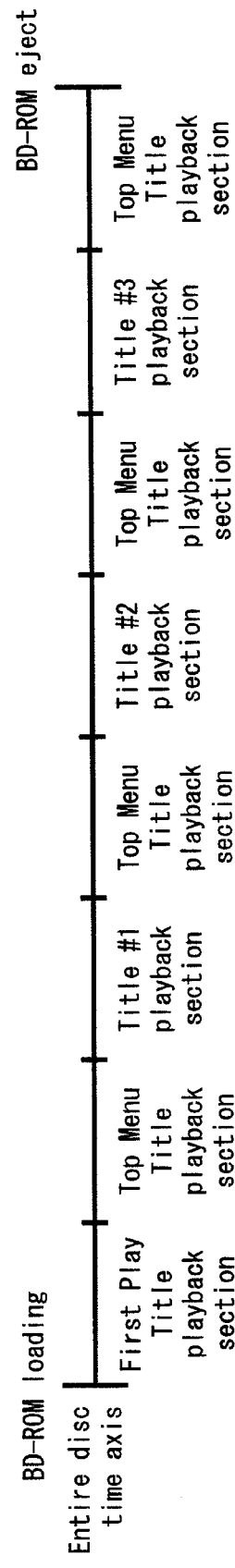
FIG. 19B shows a structure on the time axis of the entire BD-ROM.

The following shows how a Title is defined as a life cycle in the disc content that has the status transition shown in FIG. 18. Suppose, after the BD-ROM is loaded, branches are made in ascending order of the numbers indicated by the arrows jh1, jh2, jh3, jh4, . . . in FIG. 18, and then the BD-ROM is ejected. This being the case, a continuous time band from the loading to ejection of the BD-ROM can be regarded as one time axis. This time axis is set as the time axis of the entire disc. FIG. 19A shows the time axis of the entire disc. FIG. 19B shows how the time axis is structured. As shown in FIG. 19B, the time axis of the entire disc is composed of a section during which the FirstPlayTitle is played back, a section during which the TopMenuTitle is played back, a section during which Title #1 is played back, and the like. The playback sections of these Titles are defined as follows. Since a Title is composed of only one BD-J Object, a period during which a MovieObject or a BD-J Object is valid can be regarded as a playback section of a Title.

Figure 20A:
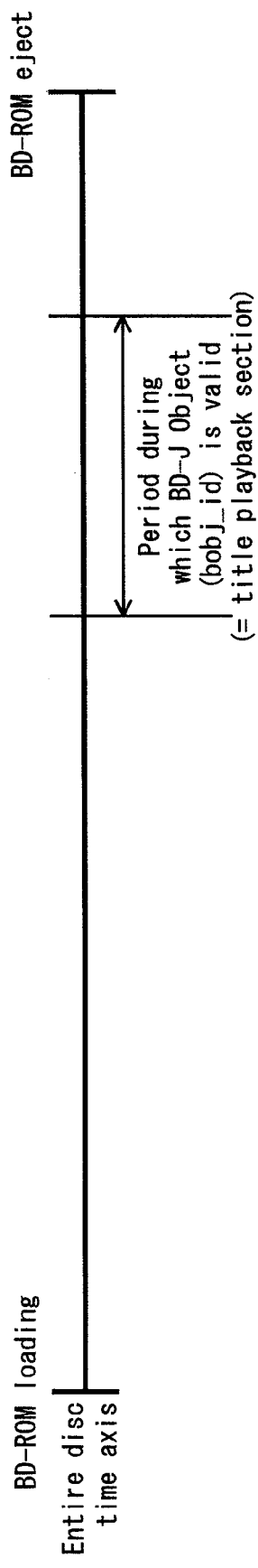
FIGS. 20A and 20B each show a Title playback section specified by a BD-J Object on the time axis of the entire BD-ROM.

That is to say, the FirstPlayTitle, the TopMenuTitle, and the other Titles are each composed of dynamic scenarios. Therefore, the playback section of a Title can be defined as a period during which a BD-J Object, which constitutes the Title, is activated as a current BD-J Object and decoded/executed in the playback device. FIG. 20A shows, on the time axis of the entire BD-ROM, a Title playback section that is designated by a BD-J Object identified by the identifier bobj_id. Here, if the BD-J Object identified by the identifier bobj_id constitutes one Title, a period on the BD-ROM time axis during which the BD-J Object identified by the identifier bobj_id is valid can be regarded as the playback section of the Title.

The period during which a BD-J Object is activated lasts until a Title branch is performed. That is to say, the dynamic scenario, which is the execution target, is treated as the current BD-J Object until a Title branch is performed, so that a period that lasts until a JumpTitle occurs in the BD-J Object is treated as a Title section.

Figure 20B:
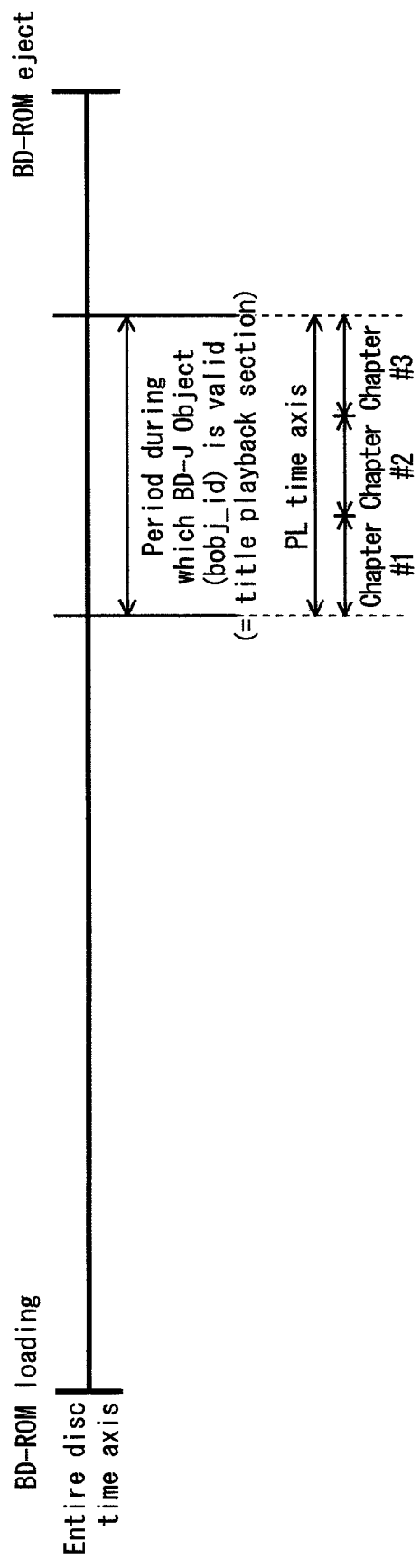

The following describes a relationship between a Title section and a PL time axis. As described above, in a Movie Object or a BD-J Object, a PlayList playback procedure can be written as one processing procedure. If a PlayList playback procedure is written, all or part of the above-described PL time axis belongs to a Title section. Suppose a PlayList management table is written in the BD-J Object in the example shown in FIG. 20A. In this case, as shown in FIG. 20B, the PL time axis belongs to the Title section that corresponds to the BD-J Object. Since a plurality of Chapters (Chapters #1,#2, #3) can be defined further to the PL time axis, domains "entire BD-ROM-Title-PlayList-Chapter" exist on the BD-ROM time axis. It is possible to write the life cycle of the application by using these domains. It should be noted here that since the PlayList playback is performed simultaneously with the application execution, a Title branch may happen in the middle of the PlayList playback. In such a case, only part of the PlayList time axis, not the entire PlayList time axis, belongs to one Title playback section. That is to say, whether only part of the PlayList time axis or the entire PlayList time axis belongs to one Title playback section depends on when a Title branch occurs.

Figure 21:
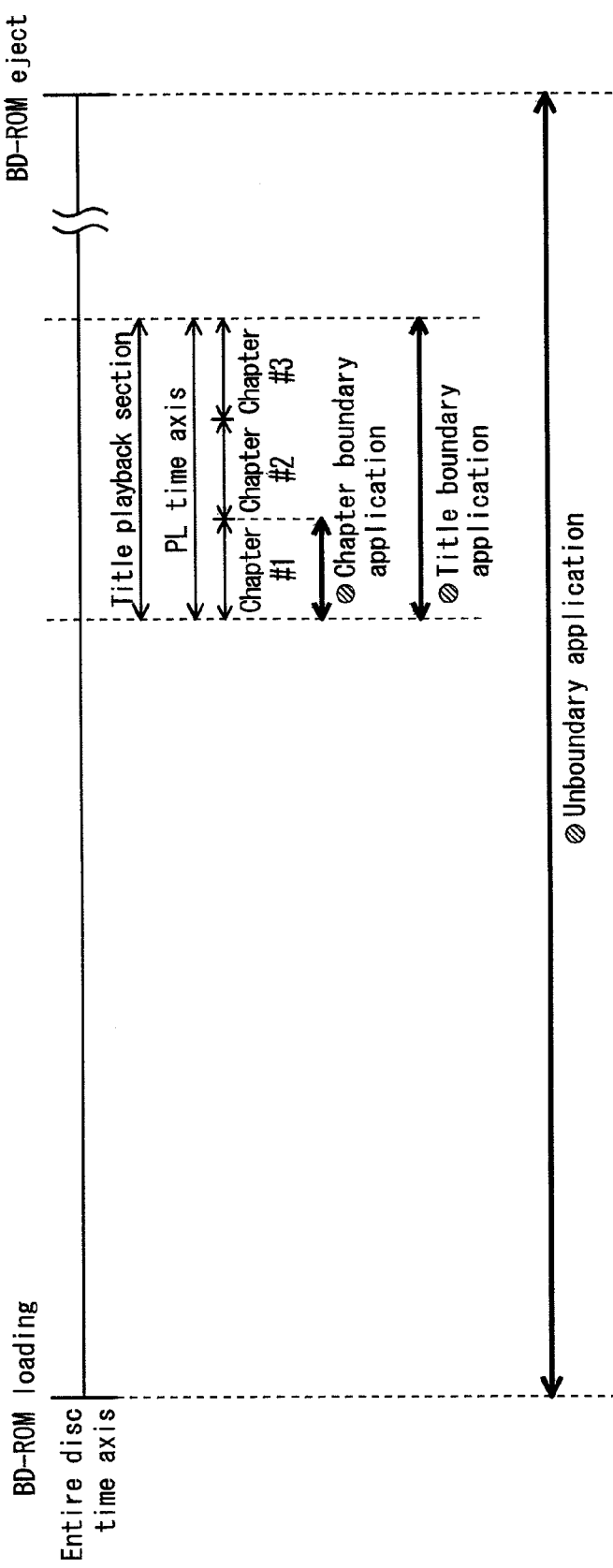
FIG. 21 shows a typical life cycle defined on the time axis of FIG. 20B.

FIG. 21 shows a typical life cycle defined on the time axis shown in FIG. 20B. As shown in the drawing, there are three typical applications that are a Title boundary application whose life cycle is a Title, a Chapter boundary application whose life cycle is a Chapter within a Title, and a Title unboundary application whose life cycle is the time axis of the entire BD-ROM.

Of these, the life cycle of the Title boundary application can be defined using the identifier of the Title. Also, the life cycle of the Chapter boundary application can be defined using a combination of the identifier of the Title to which the Chapter belongs and the identifier of the Chapter.

Even if the platform is operating, it is possible to regain resources from the application after the life cycle defined as a Title or a Chapter ends. Since the change to regain resources is assured, the operation of the platform can be stabilized.

Figure 22:
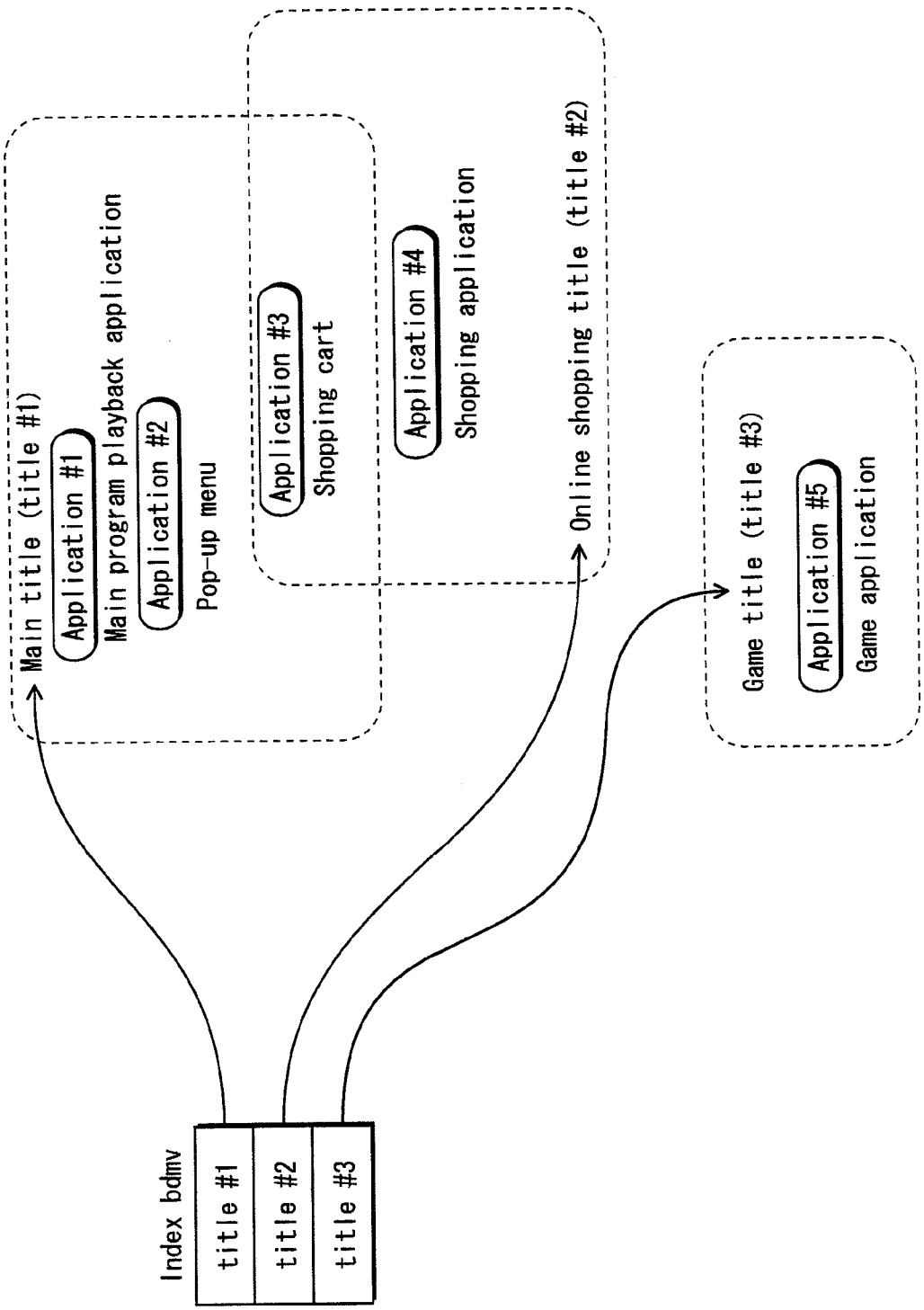
FIG. 22 shows disc content containing three Titles that are a main Title, an online shopping Title, and a game Title.

The following describes how to write the life cycle in the application management table, using a specific example which includes disc content that will be implemented in near future, as the material. The disc content used as the material here includes three different types of titles: a main Title (title #1) that constitutes main video; an online shopping Title (title #2) that constitutes online shopping; and a game Title (title #3) that constitutes a game application. FIG. 22 shows disc content that includes three titles that are the main Title, the online shopping Title, and the game Title. The left-hand side of FIG. 22 shows Index.bdmv, and the right-hand side shows the three Titles.

The dotted-line frames on the right-hand side show relations as to which Title each application belongs to. Of the three Titles, title #1 is composed of three applications that are application #1, application #2, and application #3, title #2 is composed of two applications that are application #3 and application #4, and title #3 is composed of application #5. In the example shown in FIG. 22, application #3 is run by both title #1 and title #2.

Figure 23:
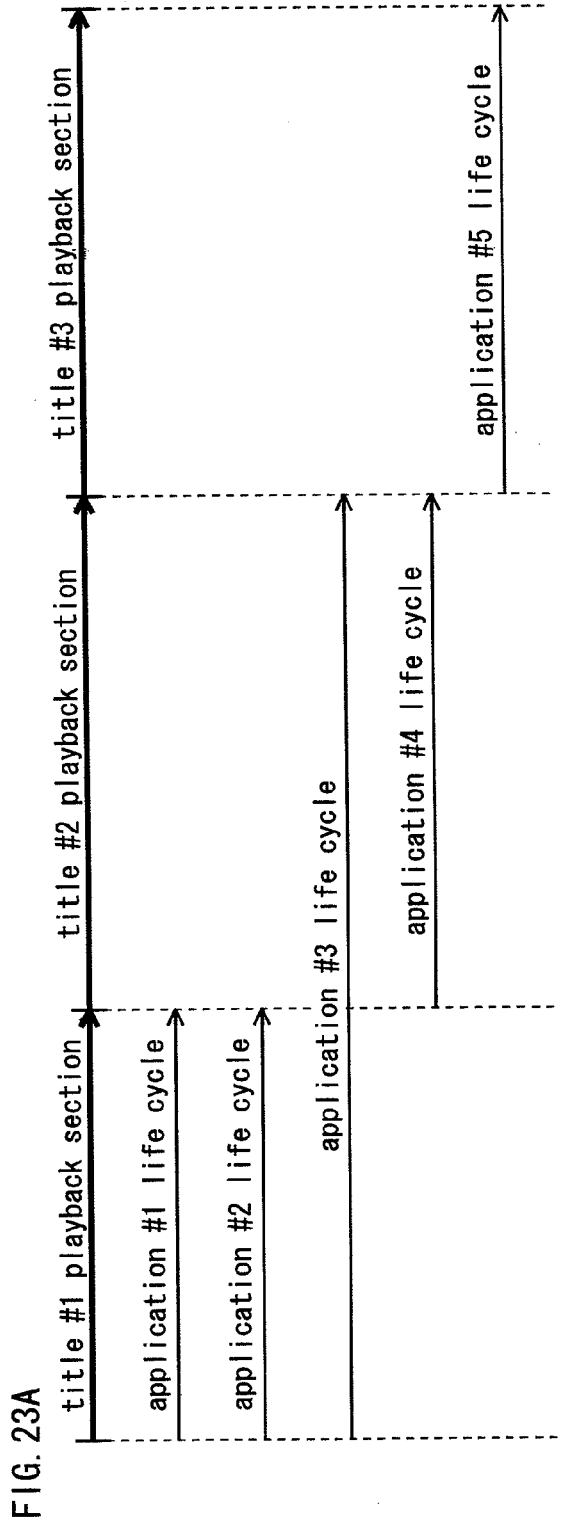
FIGS. 23A and 23B shows examples of an application management table and a life cycle.

FIG. 23A shows the life cycle of each application, which is drawn as a graph based on the relations shown by the dotted-line frames of FIG. 22. In FIG. 23A, the horizontal axis indicates title playback sections, and the life cycle of each application is arranged in the vertical axis direction. Here, application #1 and application #2 belong only to title #1, and therefore the life cycles of these applications are confined to title #1. Application #4 belongs only to title #2, and therefore the life cycle of application #4 is confined to title #2. Application #5 belongs only to title #3, and therefore the life cycle of application #5 is confined to title #3. Application #3 belongs to titles #1 and #2, and therefore the life cycle of application #3 extends over titles #1 and #2. FIG. 23B shows application management tables for titles #1, #2, and #3 that are written based on the life cycles shown in FIG. 23A. After the application management tables are written in this way, application #1, application #2, and application #3 are loaded onto the work memory when the playback of title #1 is started. When the playback of title #2 is started, applications #1 and #2 are deleted from the work memory, causing only application #3 to remain. Similarly, it is possible to perform a control so that application #4 is loaded onto the work memory when the playback of title #2 is started, and applications #3 and #4 are deleted from the work memory when the playback of title #3 is started.

Further, it is possible to perform a control so that application #5 is loaded onto the work memory while title #3 is being played back, and application #5 is deleted from the work memory when the playback of title #3 ends.

With this construction, the number of times applications are loaded onto the work memory is minimized. This is because if a branch between Titles occurs, an application that lives in both the branch source and the branch destination is stored on the work memory, and only an application that does not live in the branch source but lives in the branch destination is loaded onto the work memory. Such a construction that decreases the number of loading times enables an unboundary application, i.e. an application that does not make one conscious about a boundary between Titles, to be achieved.

The following describes the run attributes of an application in more detail. The run attributes include "AutoRun" indicating that the application is automatically started, "Present" indicating that the application is not the target of automatic run but may be stored on the work memory of the virtual machine, and "Suspend" indicating that the application is stored on the work memory of the virtual machine but cannot be assigned the CPU power.

When a branch to a corresponding Title occurs, an application with the "AutoRun" attribute is loaded onto the work memory and is executed. When a branch from one Title to another occurs, the management body (application manager) that performs application management loads an application, which lives in the branch destination Title and whose run attribute is AutoRun, onto the work memory of the virtual machine, and executes the application. This means that the application is automatically started upon the Title branch.

The run attribute "Present" is a continuation attribute, and indicates that the status of the application in the branch source Title is maintained. This is also an attribute indicating that the corresponding application can be executed. An application whose run attribute is "Present" is permitted to be called from another application. When an application is called from another application that is being run, the management body (application manager) judges whether or not the application ID of the application is written in the application management table and whether or not the run attribute of the application is "Present". If "Present", the management body loads the application onto the work memory. If the application ID of the call destination application is not written in the application management table, the management body does not load the application onto the work memory. Only applications whose run attribute is "Present" can be called from another application. "Present" is a default run attribute that is assigned when no run attribute is specified. As a result, when the run attribute of an application is "--" indicating no specification, it means that the run attribute of the application is "Present".

"Suspend" indicates that the application is assigned a resource but is not assigned the CPU power. The attribute "Suspend" is effective, for example, in achieving a process of passing a side path while a game Title is executed.

FIG. 24 shows combinations of the three run attributes (Present, AutoRun, and Suspend) and three possible statuses of the immediately preceding Title (Not Run, Running, and Suspend). If the immediately preceding status is "Not Run" and the run attribute is "AutoRun", the application is started in the branch destination Title.

If the immediately preceding status is "Not Run" and the run attribute is "Present" or "Suspend", no operation is performed with regard to the application in the branch destination Title, and the status is maintained.

If the immediately preceding status is "Running" and the run attribute is "Present" or "AutoRun", no operation is performed with regard to the application in the branch destination Title, and the status is maintained.

If the run attribute is "Suspend", the status of the application is suspended. If the immediately preceding status is "Suspend" and the run attribute in the branch destination Title is "Suspend", the status "Suspend" is maintained. If the immediately preceding status is "Suspend" and the run attribute in the branch destination Title is "Present" or "AutoRun", the application is resumed in the branch destination Title. Defining life cycles and run attributes in the application management table makes it possible to perform synchronous controls to run Java™ applications in accordance with the progress of Title playback sections. This enables achievement and provision of various applications that cause video to be played back and programs to be executed.

If the immediately preceding status is "Suspend" and the run attribute in the branch destination Title is "Present", the immediately preceding status "Suspend" may be maintained.

Lastly, the "run priority" for each application is described below.

The run priority takes values from 0 to 255. When memory resources run short or when the CPU load is high, the application manager can use the run priority to decide which application is to be terminated forcefully, or from which application resources are to be regained. The application manager terminates an application with a low run priority, and keeps an application with a high run priority.

The run priority can also be used in arbitration between applications whose requests to a PlayList which is being played back conflict with each other. Suppose one application is fast forwarding a PlayList. If another application issues a pause request for the same PlayList, the application manager compares the run priorities assigned to these applications. If the fast-forwarding application has a higher run priority, the fast-forwarding by this application is continued. If the pause-requesting application has a higher run priority, on the other hand, the PlayList which is being fast-forwarded is paused.

With the above-described life cycle, run attribute, and run priority, it is possible to limit the number of applications that can operate on the virtual machine to no more than a predetermined number at the time of authoring. As a result, the stable operation of applications can be ensured.

<PlayList Management Table>

The application management table is as described above. The following describes the PlayList management table (PLMT). The PlayList management table shows playback controls that need be performed simultaneously with execution of each application during the life cycle of the application. The operation of an application is unstable, and there may be a start-up failure or an abnormal termination. In view of this, a PlayList management table is provided for each application life cycle in this embodiment, as a Fail Safe mechanism that functions in case of a start-up failure or an abnormal termination. The PlayList management table is information that defines a playback control which need be performed when the life cycle of an application starts. The playback control referred to here is playback of an AVClip based on PlayList information. By performing the playback control based on the PlayList information at the same time, the application execution and the PlayList playback are performed simultaneously. This embodiment describes the case where a PlayList management table is provided for each application life cycle. It should be noted here that an application provided with the PlayList management table is limited to a Title boundary application. This is because the life cycle of a Title unboundary application extends over all Titles and therefore the control of performing the PlayList playback simultaneously with the application execution is not applicable to the Title unboundary application.

Also, there is no need to define PlayList playback in regards with a Chapter boundary application, because the life cycle of the Chapter boundary application is defined on the premise that the application execution is started from a Chapter within one PlayList. As understood from the above description, the PlayList management table is defined in correspondence with a life cycle that is composed of one or more Titles.

FIG. 25A shows an internal structure of the PlayList management table. As shown in the drawing, the PlayList management table is composed of a "PL_id_ref" and a "Playback_Attribute".

FIG. 25B shows meanings of the information elements that constitute the PlayList management table.

The "PL_id_ref" indicates, by a reference value being written therein in correspondence with a PlayList identifier, a PlayList that is playable during an application life cycle. The PlayList identifier is represented by a five-digit numeric value "YYYYY" that is provided in the file YYYYY.MPLS as a filename. The "PL_id_ref" with the YYYYY written therein indicates a PlayList that is playable in a corresponding Title.

The "Playback_Attribute" is an attribute that is similar to the run attribute in the application management table, and is a playback attribute that defines how to play back the PlayList written in the "PL_id_ref" when the Title starts. Playback attributes for a PlayList are classified into "AutoPlay", "Present", and the like.

"AutoPlay" is an attribute indicating that when a branch to a corresponding Title occurs, a PlayList is played back. When a branch from one Title to another occurs, the management body (application manager) that performs application management starts playing back a PlayList which is playable in the branch destination Title and whose playback attribute is AutoPlay. As a result, the PlayList whose playback attribute is AutoPlay is automatically started upon the Title branch.

"Present" is, as is the case with the run attribute "Present", a continuation attribute, and indicates that the status of the PlayList in the branch source Title is maintained. The "Present" is also an attribute indicating that a corresponding PlayList can be played back. Consider the case where there are two Titles that are to be played back continuously, with a playback attribute of a PlayList being set to AutoPlay in the PlayList management table of the preceding Title and to Present in the PlayList management table of the current Title. This being the case, suppose a playback period of the PlayList is two hours, and a branch occurs after the lapse of one hour. Since the playback attribute of the PlayList is set to Present in the current Title, in the current Title the PlayList is played back immediately after the already-played section of one hour. By setting the playback attribute to Present in this way, even if a branch between Titles occurs, it is possible to resume the playback of the PlayList from the remaining part in the branch destination Title. This enables a series of branch Titles to continuously play back a common PlayList, thus making it easy to achieve "a common PlayList being played back in a series of Titles". When there are a plurality of branch destination Titles, it is possible, by setting the playback attribute of the PlayList to Present in each branch destination Title, to continue the playback of a common PlayList regardless of to which Title the branch is made.

It should be noted here that since there is no need to assure seamless playback at a boundary between Titles, it is permitted to interrupt PlayList playback before and after a branch in the above case where a common PlayList is played back between a plurality of Titles.

Also, a PlayList whose playback attribute is "Present" can be played back upon request from an application. When a playback request of a PlayList is issued from an application that is being run, the management body (application manager) judges whether or not the PL_id_ref of the target PlayList is written in the PlayList management table and whether or not the playback attribute of the PlayList is "AutoPlay" or "Present". If "AutoPlay" or "Present", the management body plays back the PlayList. If the PL_id_ref of the PlayList is not written in the PlayList management table, the management body does not play back the PlayList. Only a PlayList whose playback attribute is "AutoPlay" or "Present" can be played back upon request from an application. "Present" is a default playback attribute that is assigned when no playback attribute is specified. Accordingly, when the playback attribute of a PlayList is "--" indicating no specification, the playback attribute of the PlayList is "Present".

Figure 26:
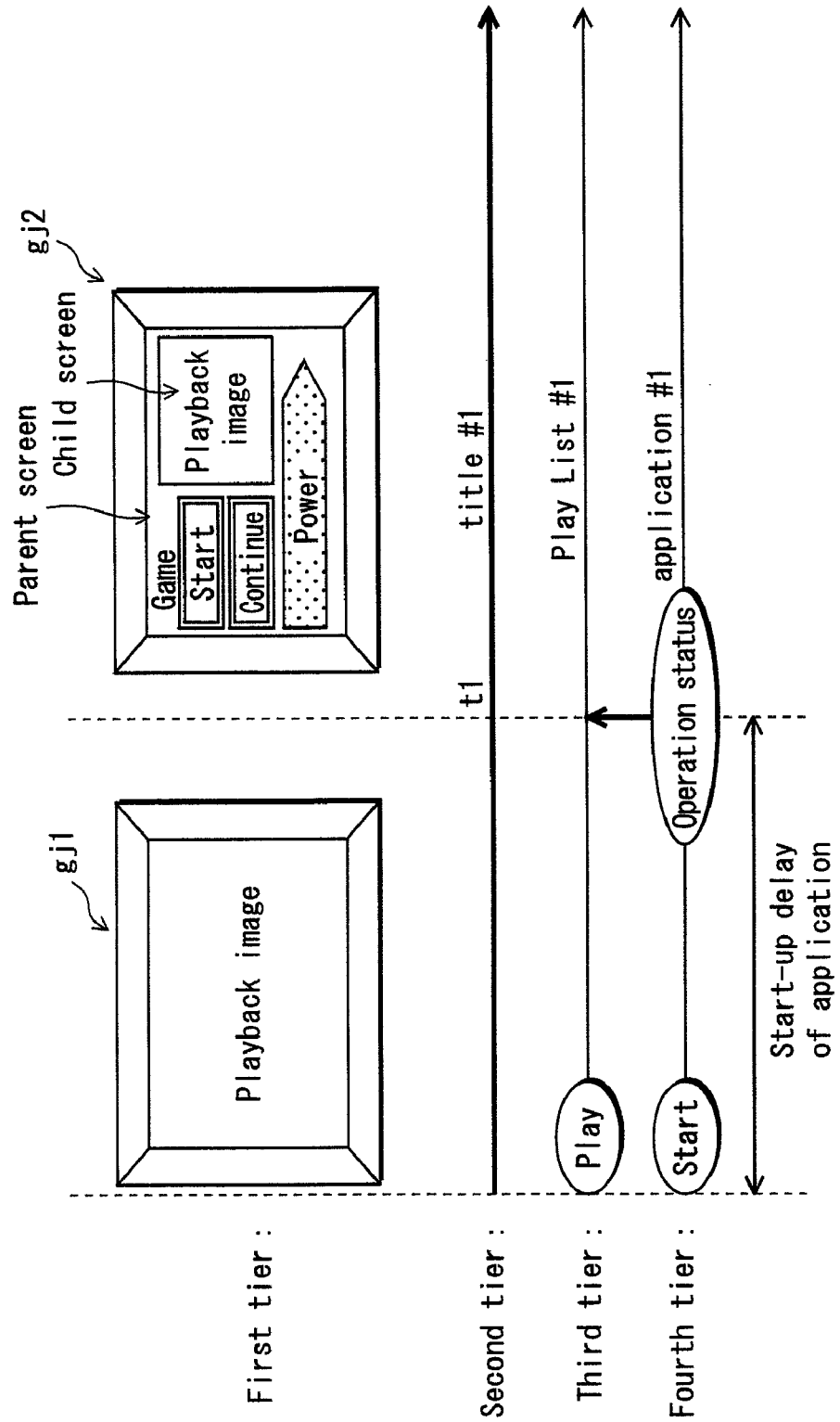
FIG. 26 shows a specific example of a Title defined by the PlayList management table and the application management table.

FIG. 26 shows a specific example of a Title defined by the PlayList management table and the application management table. In FIG. 26, the first tier shows a playback image of a Title, the second tier shows a time axis of the Title, the third tier shows a PlayList whose playback is defined by the PLMT, and the fourth tier shows the execution of an application. In the fourth tier, application #1 is started simultaneously when the Title starts, and then enters an operation status at time t1. Meanwhile, playback of PlayList #1 is started at the same time as the Title start. As a result, as shown on the left-hand side of the first tier, playback image gj1 of PlayList #1 is displayed full screen during the start-up delay of the application, namely during a period from immediately after the start of the Title to immediately before the application enters the operation status. Thus, by setting the playback attribute to "AutoPlay" in the PlayList management table, even if it takes 5 to 10 seconds for the Java™ application to enter the operation status, at least something is displayed on the screen during the start-up. This status, in which "at least something is displayed on the screen", compensates for the start-up delay that occurs upon starting a Title.

On the other hand, when application #1 enters the operation status at time t1, composite image gj2 made up of the playback image of the PlayList as a child screen and the execution image of the application as a parent screen is displayed. The execution image of the application in this example is a GUI framework for a game in which a Start button, a Continue button, and a Power indicator are arranged. The display of such a screen is achieved by the Java™ application executing the drawing process of the GUI framework.

This ability of providing a Title that forms playback video from a combination of PlayList playback video and a GUI framework of a Java™ application is the feature of the PLMT.

FIG. 27 shows six combinations of three possible statuses of the branch destination Title, namely the current Title ((i) Not having PlayList management table, (ii) Having PlayList management table and AutoPlay, and (iii) Having PlayList management table and Present) and two possible statuses of the PlayList in the immediately preceding Title (Not being played back, and Being played back).

Of these six combinations shown in the drawing, in the combination of "Immediately preceding status=Not being played back" and "Branch destination Title has PlayList management table, and Playback attribute is AutoPlay", the playback of the PlayList is automatically started in the branch destination Title.

Also, in the combination of "Immediately preceding status=Being played back" and "Branch destination Title does not have PlayList management table", the playback of the PlayList is automatically stopped in the branch destination Title.

In the combinations other than these two, the status in the branch source Title is maintained. Based on the PlayList management table, playback of a PlayList is started only when the PlayList has not been played back in the branch source Title and the playback attribute of the PlayList is AutoPlay in the branch destination Title. As a result, there is no need to start playing back a PlayList each time a branch between Titles occurs. Accordingly, the number of starting PlayList playback can be minimized even if a lot of branches between Titles occur.

Figure 28A:
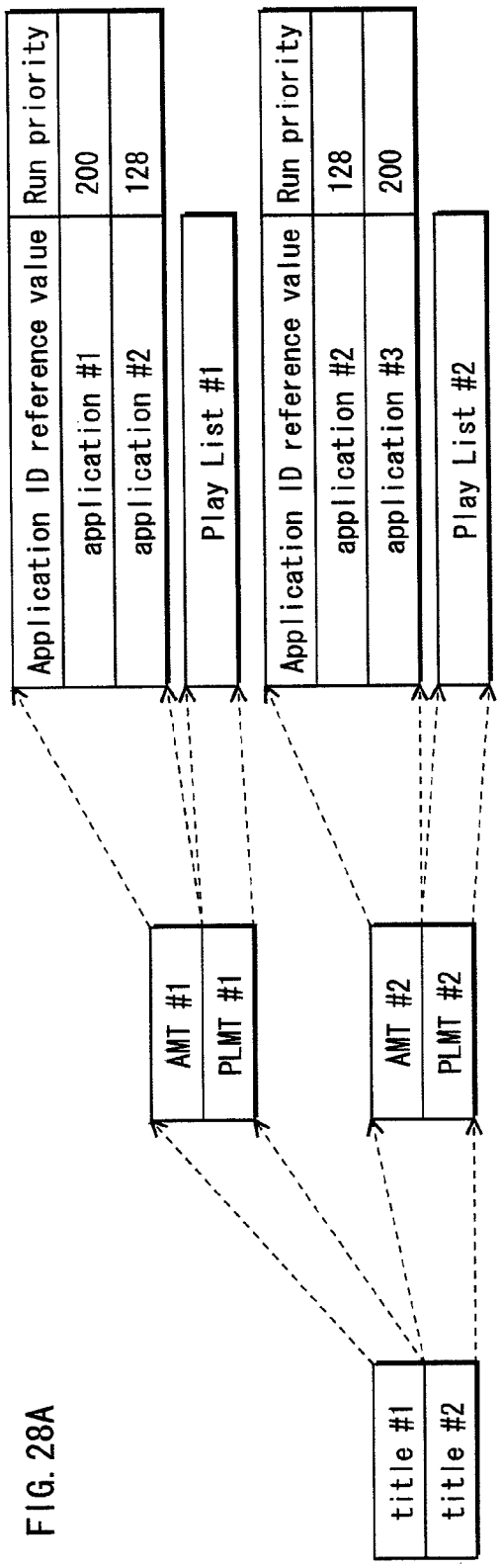
FIG. 28A shows a description example of the PlayList management table and the application management table.
Figure 28B:
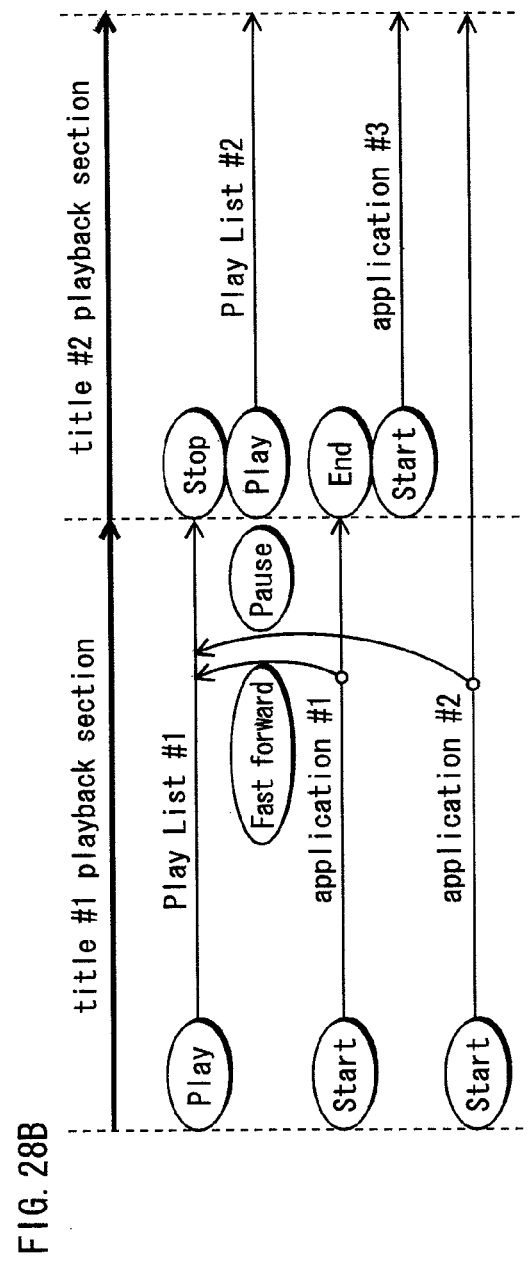
FIG. 28B shows how PlayList playback and application execution progress according to the application management table and the PlayList management table described as shown in FIG. 27A.

The following describes how to write the PlayList management table and the application management table, with reference to FIG. 28A. In this specific example, two continuous Titles (title #1, title #2) are used. In the table for title #1, application #1 and application #2 are written as AutoRun applications. In the table for title #2, application #2 and application #3 are written as AutoRun applications. Meanwhile, in the PlayList management table for title #1, PlayList #1 is written as an AutoPlay PlayList, and in the PlayList management table for title #2, PlayList #2 is written as an AutoPlay PlayList. FIG. 28B shows how the PlayLists are played back and the applications are executed based on the PlayList management tables and the application management tables written as shown in FIG. 28A.

According to the above PlayList management table and application management table in title #1, at the start of title #1, applications #1 and #2 are automatically started, and playback of PlayList #1 is automatically started.

According to the above PlayList management table and application management table in title #2, the execution of application #1, which is written in the table for title #1 but not written in the table for title #2, is stopped. Similarly, the playback of PlayList #1, which is written in the table for title #1 but not written in the table for title #2, is stopped.

The playback and execution of respective PlayList #2 and application #3, which are not written in the table for title #1 but are written in the table for title #2, are automatically started. A Title branch can be used to change a PlayList to be played back to another PlayList. By using the application management table and the PlayList management table in this way, a process of switching PlayList playback upon a branch can be defined at the time of authoring.

In FIG. 28, application #1, application #2, and application #3 are assigned respectively run priorities 200, 128, and 200. By assigning such run priorities, arbitration can be performed when control requests to PlayList #1 or PlayList #2 conflict with each other. Suppose application #1 is fast forwarding PlayList #1. If application #2 issues a pause request for PlayList #1, arbitration between these applications is performed according to the run priorities of the applications shown in the application management table. Hence a process of rejecting the request by application #2 and continuing the control by application #1 can be defined at the time of authoring. The use of the run priorities together with the PlayList management table makes it possible for the playback device to perform arbitration when controls for a PlayList conflict with each other.

Figures 29A, 29B:
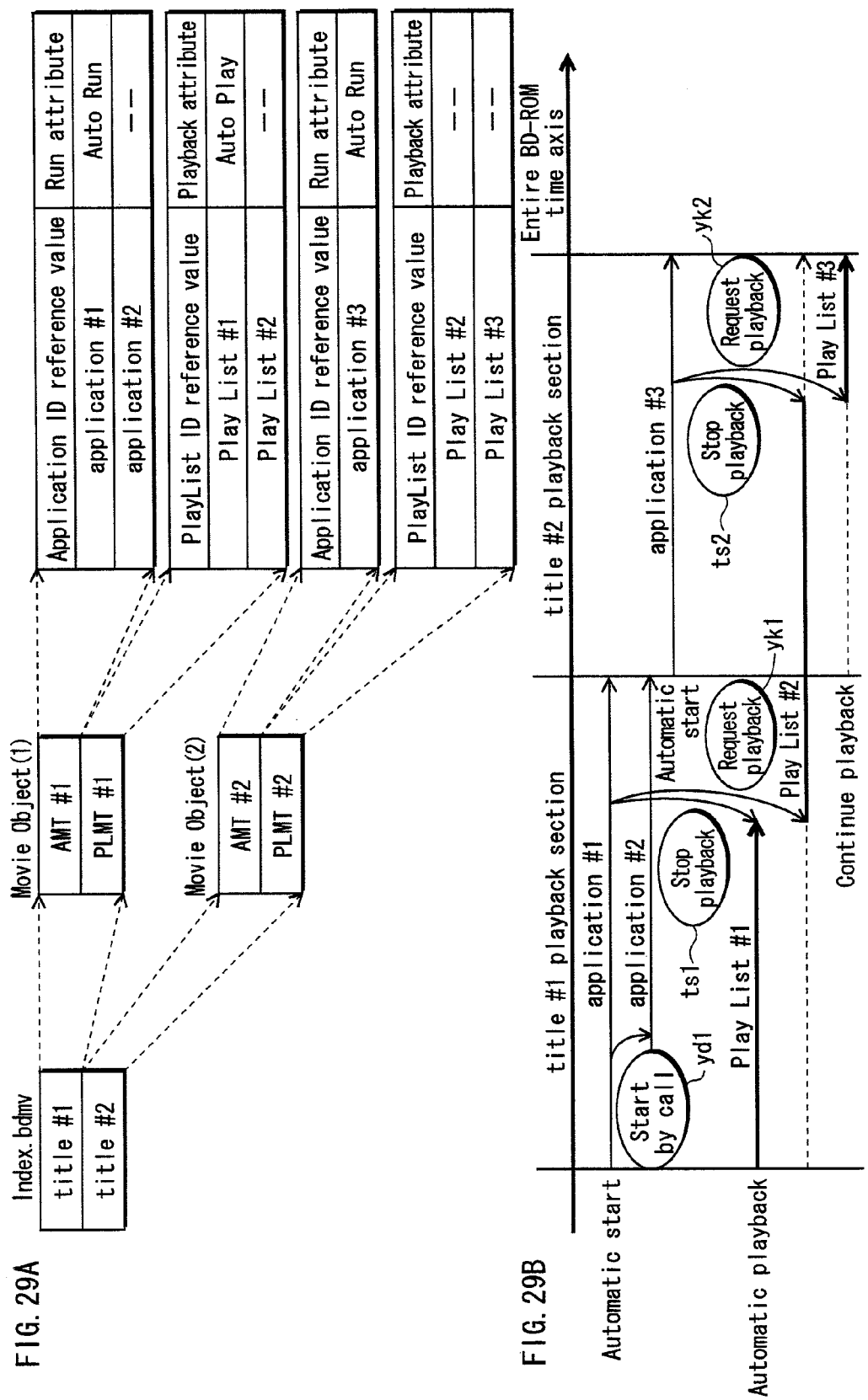
FIG. 29A shows another description example of the PlayList management table.
FIG. 29B shows a progress of application execution and PlayList playback based on the case of FIG. 28A.

The following describes another specific example of the description of the PlayList management table. FIG. 29A shows an example of the description of the PlayList management table. In this example, two continuous Titles (title #1, title #2) are used. In the PlayList management table for title #1, PlayList #1 is written as an AutoPlay PlayList, and PlayList #2 is written as a playable PlayList. In the application management table for title #1, application #1 is written as an AutoRun application, and application #2 is written as an executable application. Meanwhile, in the PlayList management table for title #2, PlayList #2 and PlayList #3 are written as playable PlayLists. In the application management table for title #2, application #3 is written as an AutoRun application. FIG. 29B shows the progress of application execution and PlayList playback in the case of FIG. 29A. Since application #1 is written as an AutoRun application in the application management table of title #1, application #1 is automatically started when title #1 starts. Also, since application #2 is written as an executable application in the application management table of title #1, application #2 is started by a call ydl from application #1.

In the application management table of title #2, there is no description of applications #1 and #2, but instead application #3 is written as an AutoRun application. Therefore, at the boundary between title #1 and title #2, applications #1 and #2 are stopped, and application #3 is automatically started. In the PlayList management table of title #1, Play Lists #1 and #2 are written as playable PlayLists. Of these playable PlayLists, PlayList #1 has the AutoPlay attribute. As a result, PlayList #1 is automatically played back at the start of title #1.

In the PlayList management table of title #1, PlayList #2 is written as a playable PlayList as well as PlayList #1. Accordingly, application #1 can execute PlayList switching by stopping the playback of PlayList #1 and requesting the playback of PlayList #2.

In the PlayList management table of title #2, PlayLists #2 and #3 are written as playable PlayLists, while there is no PlayList with the AutoPlay attribute. As a result, the playback of PlayList #1, which was automatically started at the start of title #1, may continue during title #1, but automatically stops at the start of title #2.

On the other hand, the playback of PlayList #2, if it continues through title #1, continues also into title #2. In the PlayList management table of title #2, PlayList #2 and Play List #3 are written as playable PlayLists. As a result, it is possible for application #3, which is run in title #2, to achieve PlayList switching by stopping the playback of PlayList #2 and requesting the playback of PlayList #3.

By setting the playback attribute to "AutoPlay" in the PlayList management table as described above, even if it takes 5 to 10 seconds to start a Java™ application, at least something is displayed on the screen during the start-up. That is to say, even if it takes time to start an application, at least something is displayed on the screen during the start-up. This compensates for the prolonged start-up delay which is caused by the time-consuming process of application start-up.

Defining the application management table and the PlayList management table makes it possible to perform a synchronous control of running a Java™ application in accordance with the progress of a Title playback section. As a result, various applications for video playback and program execution can be achieved.

<Operation>

Figure 30:
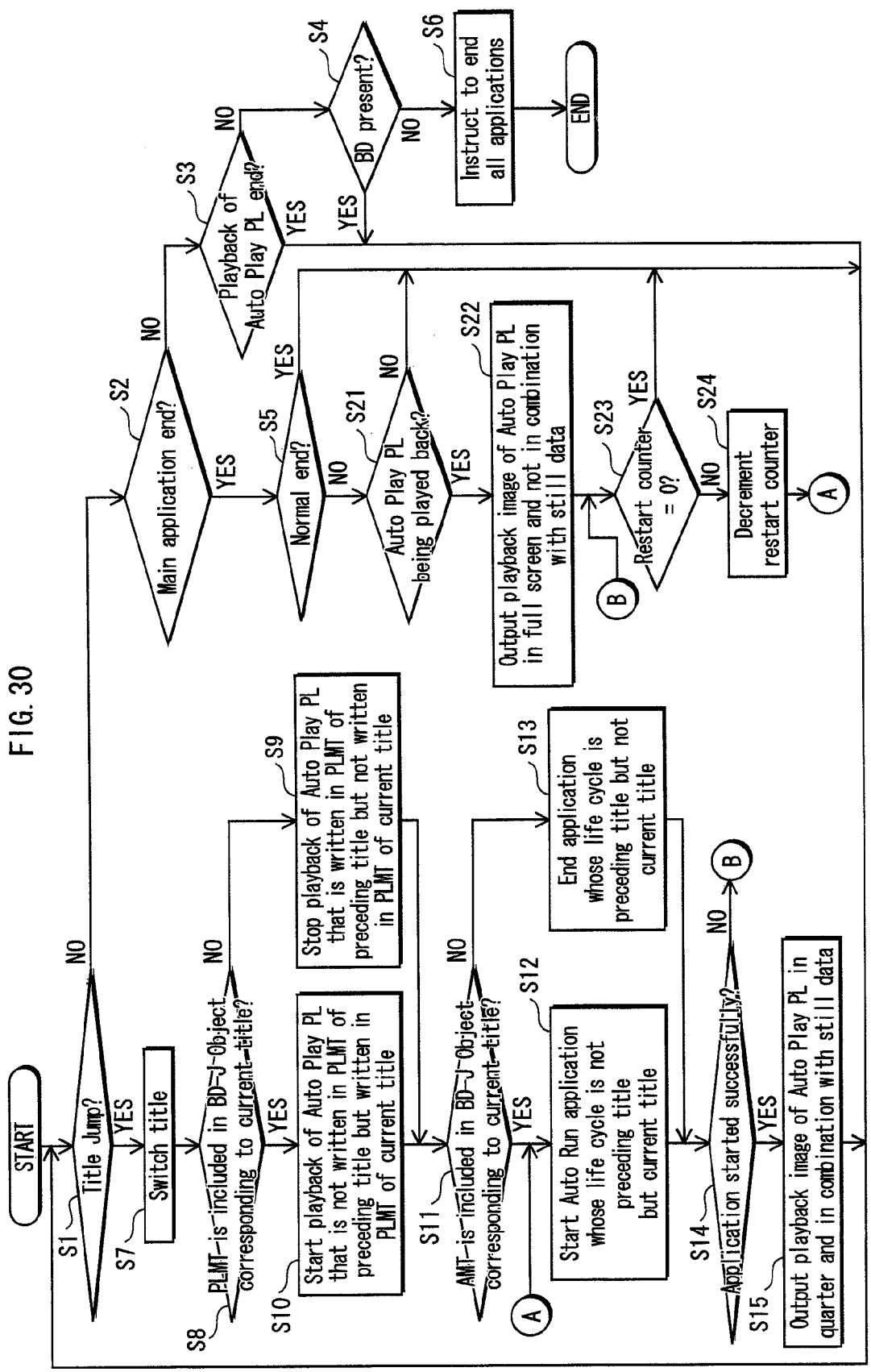
FIG. 30 is as flowchart showing an operation of the playback device 100 for judging whether to combine a still plane.
Figure 31:
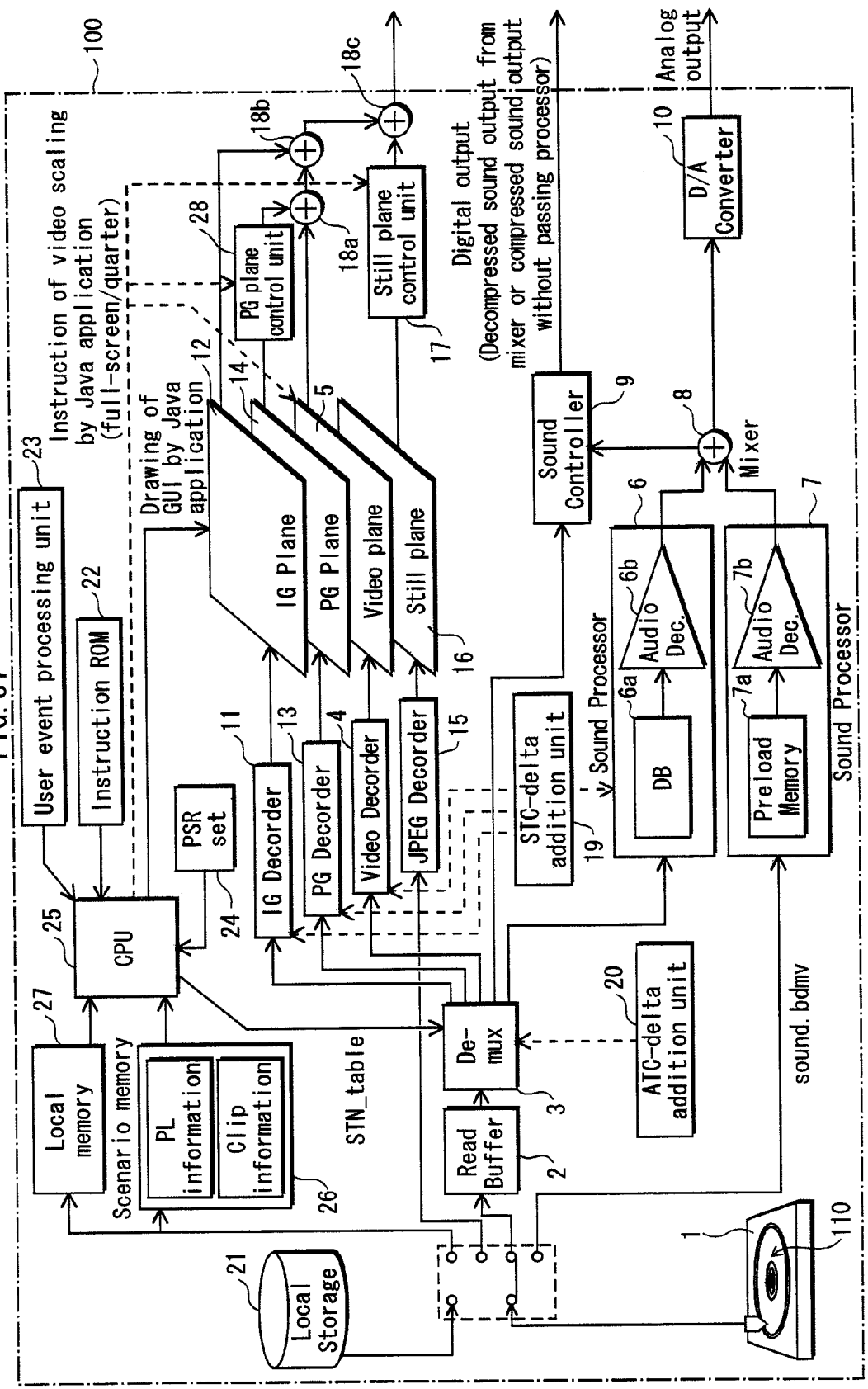
FIG. 31 is a block diagram showing a functional construction of a playback device 100 according to a second embodiment.

The following describes an operation of loading the BD-ROM 110, playing back a moving image, and displaying a menu in the playback device 100 of this embodiment, using a flowchart shown in FIG. 30. This operation is carried out by the application manager 37.

As shown in FIG. 30, first a judgment is made as to whether a Title jump occurred (step S1). If a Title jump occurred (step S1: YES), Title switching is executed (step S7), and a judgment is made as to whether a PLMT is present in a BD-J Object corresponding to a current Title (step S8).

If the PLMT is present (step S8: YES), the playback of a PlayList which is not written in the PLMT of a preceding Title but is written in the PLMT of the current Title, and which has the AutoPlay attribute is started. If the PLMT is not present (step S8: NO), the playback of a PlayList which is written in the PLMT of the preceding Title but is not written in the PLMT of the current Title, and which has the AutoPlay attribute is stopped.

Next, a judgment is made as to whether there is an application management table corresponding to the current Title (step S11).

If the application management table exists (step S11: YES), an application having the AutoRun attribute, among the Java™ applications whose life cycles are not the preceding Title but are the current Title is started. If there is no application management table (step S11: NO), an application whose life cycle is the preceding Title but is not the current Title is stopped.

Following this, a judgment is made as to whether the application started successfully (step S14). If the application started successfully (step S14: YES), the video plane 5 and the Still plane control unit 17 are instructed to convert a playback image of the PlayList having the AutoPlay attribute into quarter. Having received the instruction, the Still plane control unit 17 also outputs still data from the Still plane 16 (step S15). As a result, an image that also includes the still data of the Still plane 16 is displayed on the television 130. If the application did not start successfully (step S14: NO), the operation moves to step S23 to execute subsequent processing.

If no Title jump occurred (step S1: NO), a detection is made as to whether a main application has ended (step S2).

If the main application ended (step S2: YES), a judgment is made as to whether this application ended normally (step S5). If the application ended normally (step S5: YES), the operation returns to step S1 to execute subsequent processing.

If the application ended abnormally (step S5: NO), a judgment is made as to whether an AutoPlay PL is being played back (step S21). If so (step S21: YES), the CPU 25 instructs to output the data of the video plane 5 in a full screen size so that a playback image of the AutoPlay PL is made full screen. The CPU 25 issues the same instruction to the Still plane control unit 17. Upon receiving the instruction, the Still plane control unit 17 suppresses the output of still data stored on the Still plane 16 (step S22). As a result, a composite image that does not include the still data is displayed on the television 130.

After this, a judgment is made as to whether a restart counter is 0 (step S23). The restart counter referred to here is a control variable for specifying the number of restarts of an application. When the restart counter is 0 (step S23: YES), the operation returns to step S1 to execute subsequent processing. If the restart counter is not 0 (step S23: NO), the restart counter is decremented and then the operation moves to step S12 to execute subsequent processing. By conducting steps S23 and S24, the activation of an application is ensured. Note here that the restart counter is reset upon the start of this flowchart.

If the main application has not ended (step S2: NO), a judgment is made as to whether the playback of the PlayList having the AutoPlay attribute ended (step S3). If the playback of the PlayList having the AutoPlay attribute ended (step S3: YES), the operation returns to step S1 to execute subsequent processing. If the playback of the PlayList having the AutoPlay attribute has not ended (step S3: NO), a judgment is made as to whether the BD-ROM exists in the BD driver 1 (step S4).

If the BD-ROM exists in the BD driver 1 (step S4: YES), the operation returns to step S1 to execute subsequent processing. If the BD-ROM does not exist in the BD driver 1 (step S4: NO) an instruction to end all applications is executed (step S6), and then the operation ends.

The operation from the loading of the BD-ROM 110 to the playback device 100 to the ejection of the BD-ROM 110 from the playback device 100 is as described above. As mentioned above, whether to output data from the Still plane 16 is determined depending on whether the playback image is full screen or quarter screen. In the case of full screen, it is unnecessary to combine the data of the Still plane 16, and so the data of the Still plane 16 is not output. In this way, the memory bus bandwidth used for reading the Still plane 16 can be freed.

Second Embodiment

The following describes a second embodiment of the present invention, with reference to drawings.

In the second embodiment, a programming environment such as Java™ is introduced to achieve better interactivity, and also the output of data from the Still plane or the PG plane is controlled to effectively use the memory bus bandwidth. The second embodiment is fundamentally based on the first embodiment and so the following description focuses on the extensions or differences from the first embodiment.

<Hardware Construction of the Playback Device 100>

The playback device 100 of the second embodiment differs from the first embodiment in that a PG plane control unit 28 is added. The following describes a function of the PG plane control unit 28. The other construction elements are the same as those in the first embodiment.

The PG plane control unit 28 has a function of controlling the output of data from the PG plane 14. In detail, upon receiving a scaling instruction for the video plane 5 from the CPU 25, the PG plane control unit 28 outputs data from the PG plane 14 if the scaling instruction is a full-screen instruction to display on the whole screen of the television 130. The PG plane control unit 28 suppresses the reading of data from the PG plane 14, if the scaling instruction is a quarter-screen instruction to display on ¼ of the whole screen of the television 130.

<Operation>

Figure 32:
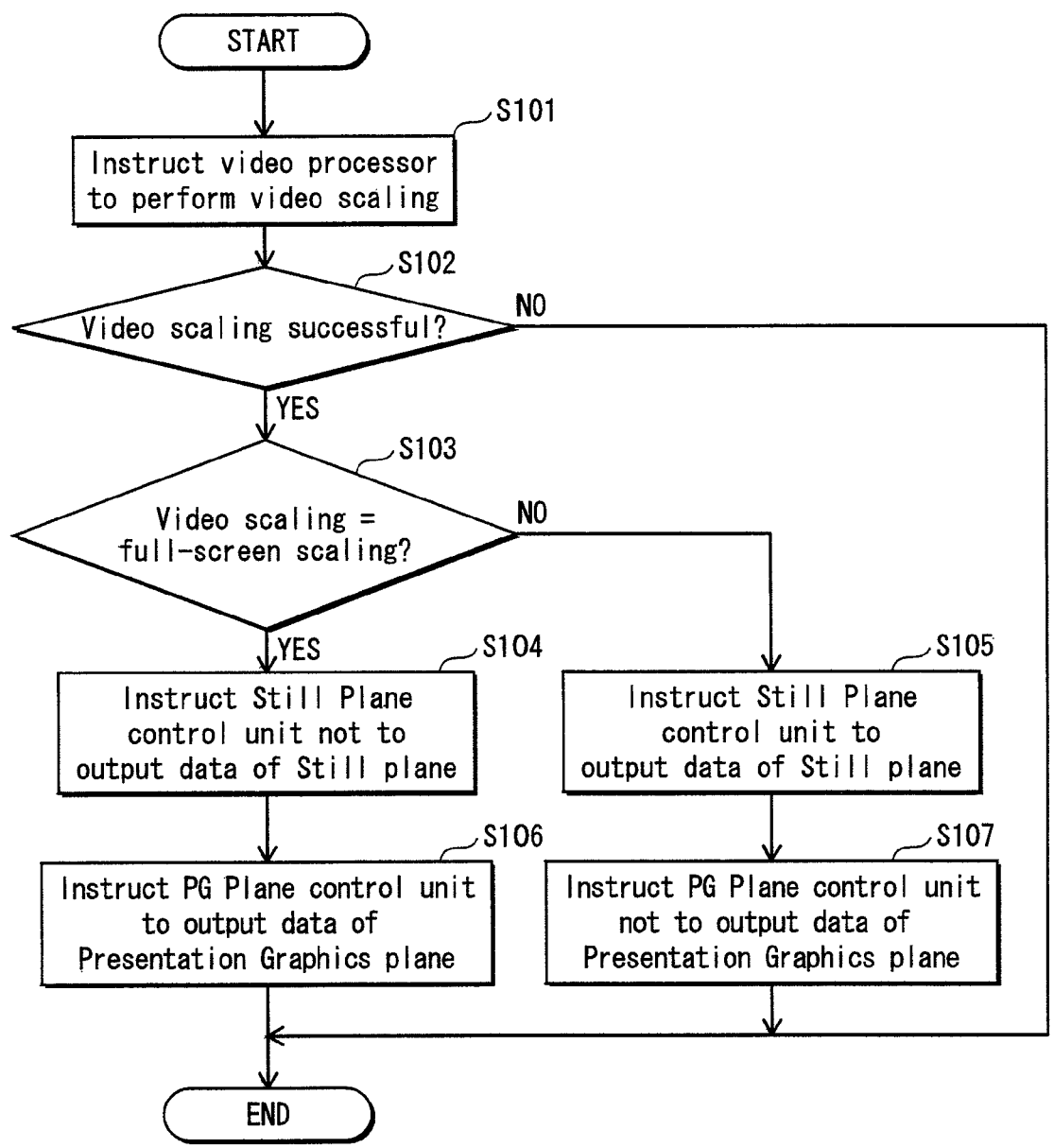
FIG. 32 is a flowchart showing an output control of data from a Still plane and a PG plane based on a video scaling instruction from an application in the second embodiment.

FIG. 32 is a flowchart showing the output control of data from the PG plane 14 and the Still plane 16 based on a request from an application in the second embodiment.

As shown in FIG. 32, when video scaling is requested by an application, the CPU 25 instructs a video processor (not illustrated) to perform video scaling (step S101).

The video processor notifies the CPU 25 whether the video scaling is successful or not (step S102). If the video scaling is successful (step S102: YES), the CPU 25 judges whether the scaling instruction is a full-screen instruction to display on the whole display screen of the television 130 (step S103).

If the scaling instruction is the full-screen instruction (step S103: YES), the CPU 25 instructs the Still plane control unit 17 to suppress the output of data from the Still plane 16 (step S104). The CPU 25 also instructs the PG plane control unit 28 to output data from the PG plane 14 (step S106), and ends the operation.

If the scaling instruction is not the full-screen instruction (step S103: NO), that is, if the scaling instruction is a quarter-screen instruction to display on ¼ of the whole display screen, the CPU 25 instructs the Still plane control unit 17 to output data from the Still plane 16 (step S105). The CPU 25 also instructs the PG plane control unit 28 to suppress the output of data from the PG plane 14 (step S107), and ends the operation.

If the video scaling is not successful (step S102: NO), the CPU 25 ends the operation.

As described above, when the video scaling to the whole screen by an application is successful, the reading of data from the Still plane 16 is suppressed while the reading of data from the PG plane 14 is executed. When the video scaling to ¼ of the whole screen by an application is successful, on the other hand, the reading of data from the Still plane 16 is executed while the reading of data from the PG plane 14 is suppressed.

Thus, by further controlling the reading of data from the PG plane 14 based on video scaling such that the data output is suppressed when the video scaling is quarter screen, the memory bus bandwidth that is originally allocated for this output can be freed.

Third Embodiment

In the first embodiment, the output control of the Still plane 16 is performed to free the corresponding memory bus bandwidth when the output of data from the Still plane 16 is unnecessary.

A third embodiment of the present invention describes another method of effectively using the memory bus bandwidth and the memory area. The following describes only the differences from the first embodiment.

As shown in the first and second embodiments, the output of data from the Still plane 16 is suppressed when the video scaling is full screen, and executed when the video scaling is quarter screen.

Also, the second embodiment describes the case where the output control based on video scaling is exercised on the PG plane 14 too. Contrary to the Still plane 16, the output of data from the PG plane 14 is executed when the video scaling is full screen, and suppressed when the video scaling is quarter screen.

Which is to say, the output of data from the PG plane 14 and the output of data from the Still plane 16 are controlled such that one output is suppressed while the other output is executed.

The third embodiment differs from the first embodiment in that one memory area is shared by the PG plane 14 and the Still plane 16. In this case, if a video scaling instruction from an application indicates full screen, this memory area is used as a memory area for the PG plane 14. If the video scaling instruction indicates quarter screen, on the other hand, this memory area is used as a memory area for the Still plane 16. In detail, the PG plane 14 and the Still plane 16 share an area of a same address on the memory.

This makes it possible to substantially free up a memory area corresponding to one plane, with such a memory area being able to be used for another purpose. For example, JPEG data to be displayed may be stored on the memory area of the Still plane 16 in a compressed state, so that the compressed JPEG data is decompressed and written to the Still plane when the output of data from the Still plane 15 is necessary.

Also, in the case of reading data too, access to a memory area corresponding to one plane becomes substantially unnecessary. Hence a corresponding memory bus bandwidth can be freed.

<Supplementary Remarks>

Though the playback device according to the present invention has been described by way of the above embodiments, the present invention is not limited to such. Example modifications are given below.

(1) The above embodiments describe the case where the playback device is a BD-ROM playback device, but this is not a limit for the present invention that can be equally realized by a DVD player and the like.

(2) The above embodiments describe the case where the Still plane control unit 17 judges whether to read still data from the Still plane based on whether or not a scale change of the video plane is made. Instead, the judgment may be made based on whether or not data to be combined exists on the PG plane for storing subtitle data.

Subtitle data is basically recorded on the BD-ROM 110 in a font size for displaying full screen and so characters may be distorted when scaled down. Therefore, when combining the PG plane, the display is always performed full screen. This being so, when the PG plane is present, the Still plane control unit 17 judges that the display is performed full screen and accordingly suppresses the reading of still data from the Still plane.

(3) The first embodiment describes the case where the memory bus bandwidth allocated to the reading of the Still plane is freed when the moving image is displayed full screen. This freed memory bus bandwidth can of course be used for another purpose.

For instance, instead of the reading of the Still plane, the memory bus bandwidth may be used for the writing of moving image data to the video plane, or for the writing of a GUI image to the IG plane. With this construction, the playback device can accelerate writing and reading cycles, with it being possible to minimize a delay in displaying images on the television.

(4) The above embodiments describe the case where a video stream is an AVClip according to the BD-ROM format, but the present invention can also be realized with a VOB (Video OBject) of the DVD-Video format or the DVD-Video Recording format. The VOB is a program stream that complies with the ISO/IEC 13818-1 Standard and is obtained by multiplexing a video stream and an audio stream. Also, the video stream in the AVClip may be an MPEG4 video stream or a WMV video stream. Further, the audio stream in the AVClip may be a Linear PCM audio stream, a Dolby AC-3 audio stream, an MP3 audio stream, an MPEG-AAC audio stream, or a dts audio stream.

(5) The above embodiments are based on MPEG4-AVC (also called H.264 or JVT). However, the present invention can equally be realized using an MPEG2 video stream. Also, the present invention is easily applicable to any other image formats (e.g. VC-1) so long as the image can be decoded individually.

(6) The above embodiments describe the case where the Still plane is not combined only when the video plane is full screen. This is because the Still plane and the video plane are both usually prepared in a full-screen size. However, even when the video plane and the Still plane are both not in a full-screen size, the Still plane may not be combined if the data of the video plane covers the entire data of the Still plane.

(7) The above embodiments describe the case where the output of data from the Still plane 16 is controlled depending on whether the video plane is full screen or quarter screen at the time of video scaling. However, the control on the data output from the Still plane 16 may be conducted at times other than video scaling.

In this case, an application is provided with a function of suppressing or executing the output of data by the Still plane control unit 17. In so doing, the control on the data output from the Still plane 16 can be exercised not only at video scaling but other times.

Also, in the second embodiment, the control on the data output from the PG plane 14 may be conducted at times other than video scaling, by providing an application with a function of suppressing or executing the output of data by the PG plane control unit 28. In so doing, the control an the data output from the PG plane 14 can be exercised not only at video scaling but other times.

(8) The above embodiments describe the case where the control on the data output from the Still plane 16 is performed based on an instruction from an application. Instead, the BD-ROM may be provided with a flag relating to the still data output control so that the output control is performed based on this flag.

(9) The above embodiments describe the case where the PG plane 14 stores only subtitles, but the PG plane 14 may store not only image data for subtitles but also a moving image other than the moving image stored on the video plane. This construction enables, for example, to divide the display screen into two areas and display different moving images in the two areas.

(10) The present invention may be the method for controlling the combination of still data on the Still plane shown in the above embodiments, or a computer program that has a computer of the playback device execute the procedure shown by this method. The computer program may be recorded on a flexible disk, a hard disk, a CD (Compact Disc), a MO (Magneto Optical disc), a DVD, a BD, a semiconductor memory, and the like.

(11) The above embodiments describe the case where the playback device 100 is realized by a system LSI, but the functions of the playback device 100 may instead be realized by a plurality of LSIs.

INDUSTRIAL APPLICABILITY

The playback device according to the present invention can be used as a playback device that can display an image without a delay while reading data from a BD-ROM and executing an application.

The invention claimed is:
1. A playback device comprising:
a memory having memory areas for a video plane for storing a moving image, an image plane for storing a GUI image to be displayed as a GUI, and a still plane for storing a background image;
a moving image writer operable to write the moving image onto the video plane;
a GUI image writer operable to write the GUI image onto the image plane;
a background image writer operable to write the background image onto the still plane;
a composite outputter operable to (a) read the moving image written onto the video plane and the GUI image written onto the image plane without reading the background image written onto the still plane if the moving image has a predetermined size sufficient to cover the whole background image, and read the moving image written onto the video plane, the GUI image written onto the image plane, and the background image written onto the still plane if the moving image does not have the predetermined size, (b) combine the read images by overlaying to generate a composite image, and (c) output an image signal representing the composite image; and
a virtual machine operable to execute an application obtained from a source outside of the playback device, the application outputting an image using the moving image and configured to issue an instruction controlling the moving image to be displayed either as a full screen display or as a scaled-down screen display,
wherein the predetermined size is a size of the moving image written onto the video plane, and
the composite outputter reads the background image written onto the still plane if the application executed by the virtual machine issues a scaling-down instruction for the video plane that stores the moving image displayed as a full screen, and does not read the background image written onto the still plane if the application does not issue the scaling-down instruction,
wherein the composite outputter, the moving image writer, the GUI image writer, and the background image writer share a memory bus connected to the memory unit, and
the GUI image writer uses, if the composite outputter does not read the background image stored on the still plane, a time or a band of the memory bus allocated to the reading of the background image from the still plane, for writing the GUI image onto the image plane.

2. The playback device of claim 1, further comprising:
an image writer operable to write an image, different from the moving image, that changes with time, onto the still plane,
wherein the still plane is further for storing the image that changes with time, and
the composite outputter (a) reads the moving image stored on the video plane, the GUI image stored on the image plane, and the image that changes with time stored on the still plane if the moving image has the size of being displayed as a full screen display, and reads the moving image written on the video plane, the GUI image written on the image plane, and the background image written on the still plane if the moving image does not have the size of being displayed as a full screen display, (b) combines the read images by overlaying to generate a composite image, and (c) outputs an image signal representing the composite image.

3. An image combination method for combining images in a playback device including a virtual machine and memory having memory areas for a video plane for storing a moving image, an image plane for storing a GUI image to be displayed as a GUI, and a still plane for storing a background image, the image combination method comprising:

writing the moving image onto the video plane;
writing the GUI image onto the image plane;
writing the background image onto the still plane;
outputting a composite including (a) reading the moving image written onto the video plane and the GUI image written onto the image plane without reading the background image written onto the still plane if the moving image has a predetermined size sufficient to cover the whole background image, and reading the moving image written onto the video plane, the GUI image written onto the image plane, and the background image written onto the still plane if the moving image does not have the predetermined size, (b) combining the read images by overlaying to generate a composite image, and (c) outputting an image signal representing the composite image; and
causing the virtual machine to execute an application obtained from a source outside of the playback device, the application outputting an image using the moving image and configured to issue an instruction controlling the moving image to be displayed either as a full screen display or as a scaled down screen display,
wherein the predetermined size is a size of the full screen display of the moving image written onto the video plane, and
the composite outputting reads the background image written onto the still plane if the application executed by the virtual machine issues a scaling-down instruction for the video plane that stores the moving image displayed as a full screen display, and does not read the background image written onto the still plane if the application does not issue the scaling-down instruction,
wherein the composite outputting, the moving image writing, the GUI image writing, and the background image writing share a memory bus connected to the memory unit, and
the GUI image writing uses, if the composite outputting does not read the background image stored on the still plane, a time or a band of the memory bus allocated to the reading of the background image from the still plane, for writing the GUI image onto the image plane.

4. A non-transitory computer readable medium that stores an image combination program including a procedure for controlling a computer of a playback device to combine images, the playback device including a virtual machine and a memory having memory areas for a video plane for storing a moving image, an image plane for storing a GUI image to be displayed as a GUI, and a still plane for storing a background image, the image combination program including the procedure comprising:
writing the moving image onto the video plane;
writing the GUI image onto the image plane;
writing the background image onto the still plane;
outputting a composite including (a) reading the moving image written onto the video plane and the GUI image written onto the image plane without reading the background image written onto the still plane if the moving image has a predetermined size sufficient to cover the whole background image, and reading the moving image written onto the video plane, the GUI image written onto the image plane, and the background image written onto the still plane if the moving image does not have the predetermined size, (b) combining the read images by overlaying to generate a composite image, and (c) outputting an image signal representing the composite image; and
causing the virtual machine to execute an application obtained from a source outside of the playback device, the application outputting an image using the moving image and configured to issue an instruction controlling the moving image to be displayed either as a full screen display or as a scaled down screen display,
wherein the predetermined size is a size of the full screen display of the moving image written onto the video plane, and
the composite outputting reads the background image written onto the still plane if the application executed by the virtual machine issues a scaling-down instruction for the video plane that stores the moving image displayed as a full screen display, and does not read the background image written onto the still plane if the application does not issue the scaling-down instruction,
wherein the composite outputting, the moving image writing, the GUI image writing, and the background image writing share a memory bus connected to the memory, and
the GUI image writing uses, if the composite outputting does not read the background image stored on the still plane, a time or a band of the memory bus allocated to the reading of the background image from the still plane, for writing the GUI image onto the image plane.

5. An integrated circuit installed in a playback device for combining images and outputting a composite image and including a virtual machine operable to execute an application relating to a moving image, the integrated circuit comprising:
a memory having memory areas for a video plane for storing a moving image, an image plane for storing a GUI image to be displayed as a GUI, and a still plane for storing a background image;
a moving image writer operable to write the moving image onto the video plane;
a GUI image writer operable to write the GUI image onto the image plane;
a background image writer operable to write the background image onto the still plane; and
a composite outputter operable to (a) read the moving image written onto the video plane and the GUI image written onto the image plane without reading the background image written onto the still plane if the moving image has a predetermined size sufficient to cover the whole background image, and read the moving image written onto the video plane, the GUI image written onto the image plane, and the background image written onto the still plane if the moving image does not have the predetermined size, (b) combine the read images by overlaying to generate a composite image, and (c) output an image signal representing the composite image, and
a virtual machine operable to execute an application obtained from a source outside of the playback device, the application outputting an image using the moving image and configured to issue an instruction controlling the moving image to be displayed either as a full screen display or as a scaled-down screen display,
wherein the predetermined size is a size of the full screen display of the moving image written onto the video plane, and
the composite outputter reads the background image if the application executed by the virtual machine issues a scaling-down instruction for the video plane that stores the moving image to be displayed as a full screen display, and does not read the background image written onto the still plane if the application does not issue the scaling-down instruction, wherein the composite outputter, the moving image writer, the GUI image writer, and the background image writer share a memory bus connected to the memory, and the GUI image writer uses, if the composite outputter does not read the background image stored on the still plane, a time or a band of the memory bus allocated to the reading of the background image from the still plane, for writing the GUI image onto the image plane.

6. An integrated circuit for use in a playback device, the playback device including a reader, a memory and a virtual machine, the reader reading data from a recording medium, the memory having memory areas for a video plane for storing first data corresponding to a moving image read from the recording medium, an image plane for storing second data corresponding to a GUI image that is read from the recording medium and that is to be displayed as a GUI, and a still plane for storing third data corresponding to a background image read from the recording medium, the virtual machine executing an application obtained from a source obtained outside of the playback device, the application outputting an image using the moving image and configured to issue an instruction controlling the moving image to be displayed either as a full screen display or as a scaled-down screen display, the integrated circuit comprising:

a moving image writer operable to write the first data onto the video plane;

a GUI image writer operable to write the second data onto the image plane;

a background image writer operable to write the third data onto the still plane; and a composite outputter operable to (a) read the first data from the video plane and the second data from the image plane without reading the third data from the still plane if the moving image has a predetermined size sufficient to cover the whole background image, and read the first data from the video plane, the second data from the image plane, and third data from the still plane if the moving image does not have the predetermined size, (b) combine the read data by overlaying to generate a composite image, and (c) output an image signal representing the composite image, wherein the predetermined size is a size of a full-screen display of the moving image, and the composite outputter reads the third data from the still plane if the application executed by the virtual machine unit issues a scaling-down instruction for the video plane that stores the first data corresponding to the moving image displayed as a full screen display, and does not read the third data from the still plane if the application does not issue the scaling-down instruction, wherein the composite outputter, the moving image writer, the GUI image writer, and the background image writer share a memory bus connected to the memory, and the GUI image writer uses, if the composite outputter does not read the third data from the still plane, a time or a band of the memory bus allocated to the reading of the third data from the still plane, for writing the second data onto the image plane.

\* \* \* \* \*